US011835059B2

(12) United States Patent
Weinzierl et al.

(10) Patent No.: US 11,835,059 B2
(45) Date of Patent: Dec. 5, 2023

(54) HOUSING FOR A FLUID MACHINE, IN PARTICULAR FOR A RADIAL FAN

(71) Applicant: Lear Corporation, Southfield, MI (US)

(72) Inventors: Florian Weinzierl, Olching (DE); Dumitru-Cristian Leu, Freising (DE); Winfried Helmenstein, Gelnhausen (DE)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/544,259

(22) Filed: Dec. 7, 2021

(65) Prior Publication Data

US 2022/0205456 A1 Jun. 30, 2022

Related U.S. Application Data

(63) Continuation of application No. 16/631,580, filed as application No. PCT/EP2018/067851 on Jul. 2, 2018, now Pat. No. 11,225,976.

(30) Foreign Application Priority Data

Jul. 18, 2017 (DE) .......................... 102017116130.9

(51) Int. Cl.
F04D 29/42 (2006.01)
F04D 29/28 (2006.01)
F04D 29/44 (2006.01)

(52) U.S. Cl.
CPC ..... *F04D 29/4226* (2013.01); *F04D 29/4213* (2013.01); *F04D 29/281* (2013.01);
(Continued)

(58) Field of Classification Search
CPC ............. F04D 29/4226; F04D 29/4213; F04D 29/281; F04D 29/441; F04D 29/661;
(Continued)

(56) References Cited

U.S. PATENT DOCUMENTS 2,727,680 A 12/1955 Madison
3,824,028 A * 7/1974 Zenkner ................ F04D 29/422
415/206

(Continued)

FOREIGN PATENT DOCUMENTS

DE 212004000036 U1 10/2006
EP 3561310 A1 10/2019
(Continued)

OTHER PUBLICATIONS

International Search Report for Application No. PCT/EP2018/067851, dated Jan. 25, 2019, 5 pages.
(Continued)

*Primary Examiner* — J. Todd Newton
(74) *Attorney, Agent, or Firm* — BROOKS KUSHMAN P.C.

(57) ABSTRACT

The invention relates to a housing (1) for a fluid machine, in particular for a radial fan (2), comprising at least one housing part (3), wherein the housing part (3) has at least one inlet opening (7), wherein the housing part (3) can at least partially delimit a fluid chamber (8) for receiving at least one fan wheel (9), and wherein the inlet opening (7), at least in part, has a curved inlet surface (11). To produce a housing (1) for a fluid machine, in particular a housing (1) for a radial fan, preferably for use in a car seat and offering reduced noise emission together with good performance, the curved inlet surface (11) has at least in part the form of a logarithmic spiral in cross-section, and/or at least one guide element (21) extends from the inlet surface (11) towards a central axis of the inlet opening (7), and/or on the inside (17) of the housing part (3) there is provided a circumferential recess (25) which at least partially circumferentially surrounds the inlet opening (7) and/or a circumferential projection (6) which at least partially surrounds the inlet opening.

17 Claims, 17 Drawing Sheets

(52) U.S. Cl.
CPC ........ *F04D 29/441* (2013.01); *F05D 2220/40* (2013.01); *F05D 2250/51* (2013.01); *F05D 2250/52* (2013.01)

(58) Field of Classification Search
CPC ............. F05D 2220/40; F05D 2250/51; F05D 2250/52; B60N 2/5621
See application file for complete search history.

(56) References Cited

U.S. PATENT DOCUMENTS

| | | | | |
|---|---|---|---|---|
| 5,209,639 | A | * | 5/1993 | Neuber ................. F04D 29/626 415/206 |
| 5,951,245 | A | | 9/1999 | Sullivan |
| 6,030,286 | A | * | 2/2000 | Kameoka ............. F04D 29/444 415/185 |
| 9,427,538 | B2 | | 8/2016 | Daly et al. |
| 9,618,007 | B2 | * | 4/2017 | Iyer ....................... F04D 29/441 |
| 11,225,976 | B2 | * | 1/2022 | Weinzierl ............ F04D 29/4226 |
| 2002/0056453 | A1 | * | 5/2002 | Klopp ................... F04D 29/664 128/204.18 |
| 2007/0003414 | A1 | * | 1/2007 | Harman ................. F01D 9/026 415/206 |
| 2018/0023587 | A1 | * | 1/2018 | Otsuka ................... F04D 25/08 415/206 |
| 2018/0135653 | A1 | * | 5/2018 | Gebert ................. F04D 29/666 |
| 2020/0200187 | A1 | * | 6/2020 | Weinzierl ............ F04D 29/4213 |
| 2022/0205456 | A1 | * | 6/2022 | Weinzierl ............ F04D 29/4213 |

FOREIGN PATENT DOCUMENTS

| | | | | | |
|---|---|---|---|---|---|
| JP | H1162895 | A | * | 8/1997 | ............ F04D 29/44 |
| JP | 2001050193 | A | * | 2/2001 | ............ F04D 29/22 |
| JP | 2001289198 | A | * | 10/2001 | ............ F04D 29/44 |
| JP | 2004190535 | A | * | 7/2004 | ............ F04D 29/44 |
| JP | 2006307651 | A | | 11/2006 | |
| JP | 2009041517 | A | | 2/2009 | |
| JP | 2010209888 | A | | 9/2010 | |
| JP | 2013057298 | A | * | 3/2013 | ........... F04D 29/162 |
| JP | 2013057298 | A | | 3/2013 | |
| JP | 2016196208 | A | | 11/2016 | |

OTHER PUBLICATIONS

English language abstract for JP 2006-307651 A extracted from espacenet.com database on Apr. 9, 2020, 1 page.
English language abstract for JP 2009-041517 A extracted from espacenet.com database on Apr. 9, 2020, 1 page.
English language abstract for JP 2010-209888 A extracted from espacenet.com database on Apr. 9, 2020, 1 page.
English language abstract for JP 2013-057298 A extracted from espacenet.com database on Apr. 9, 2020, 1 page.
English language abstract for JP 2016-196208 A extracted from espacenet.com database on Apr. 9, 2020, 1 page.
First Office Action for German Application No. 10 2017 116 130.9, dated Feb. 8, 2022, 10 Pages (no English translation available).
Communication Pursuant to Art. 94(3) for European Application No. 20 163 060.5-1007, dated Jan. 26, 2022, 7 Pages (no English translation available).

* cited by examiner

HOUSING FOR A FLUID MACHINE, IN PARTICULAR FOR A RADIAL FAN

This application is a continuation application of U.S. patent application Ser. No. 16/631,580, filed on Jan. 16, 2020, now U.S. Pat. No. 11,225,976, issued Jan. 18, 2022, which was the National Stage of International Patent Application No. PCT/EP2018/067851, filed Jul. 2, 2018, which claims priority to DE102017116130.9, filed Jul. 18, 2017, the entire contents of which are hereby incorporated by reference.

The invention relates to a housing for a turbomachine, in particular for a radial fan.

Housings for turbomachines, in particular for radial fans, and radial fans themselves, are known in a multiplicity of embodiments in the prior art. Turbomachines, in particular radial fans, commonly serve for transporting gaseous media, for example air, through a flow system by virtue of the rotation of an impeller influencing the pressure conditions in the flow system and causing a volume flow.

Turbomachines or radial fans are often used for cooling purposes. One exemplary field of use is the ventilation of automobile seats, in the case of which at least one turbomachine, in particular at least one radial fan, is arranged in the seat. The turbomachine causes at least one volume flow which exchanges the air in the region between a passenger and the seat surface, in particular conducts said air away from the seat surface and/or feeds said air to the seat surface.

In such fields of use, in which persons are present in the immediate vicinity of an operating turbomachine, reducing the noise emissions while simultaneously achieving a high fan power is of primary importance. The turbomachines, in particular radial fans, known from the prior art have the disadvantage here that, for example in the case of high volume flows and/or pressure levels, noise emissions are generated which are unpleasant for the passenger(s).

The present invention is therefore based on the object of specifying a housing for a turbomachine, in particular a housing for a radial fan, preferably for use in an automobile seat, in the case of which the noise emissions are reduced and, at the same time, high power values are achieved.

The above-stated object is achieved by means of a housing for a turbomachine, in particular for a radial fan. The housing has at least one first housing part with at least one first inlet opening. At least one fluid chamber for accommodating at least one fan wheel can be at least partially delimited by means of the housing part. The housing part is for example a housing shell of a two-part housing. The housing and/or the housing part has, in particular, the spiral form that is common for radial fans. In the assembled state, the fluid chamber is consequently delimited by the first housing part and the second housing part, and the fan impeller is held rotatably between the first housing part and the second housing part. Alternatively, the housing part is a cover element on a single-part or multi-part housing. The housing part preferably has at least one outlet opening, and/or at least partially delimits an outlet opening of the housing in the assembled state. In the assembled state in a radial fan, it is for example the case that air is drawn into the fluid chamber at the inlet opening by means of the fan wheel and subsequently emerges from the housing again at the outlet opening.

Provision is preferably made whereby the housing is designed for single-flow radial fans, that is to say for radial fans with at least one central inlet opening, wherein, in the assembled state, the inlet opening is in particular arranged such that the inlet opening lies in a plane which is parallel to the plane of rotation of the impeller. Alternatively, provision is made whereby the housing is designed for a dual flow radial fan, that is to say has at least one first inlet opening and at least one second inlet opening. The first inlet opening and the second inlet opening are preferably arranged opposite one another, in particular of identical design. The inlet opening is preferably of circular form.

According to the present invention, the circumference of the inlet opening is not merely formed as a material recess in the housing part, but rather the circumference of the inlet opening is formed at least in certain portions as a curved inlet face. The curved inlet face preferably extends over the entire extent of the inlet opening. The inlet opening is consequently, in the region of its circumference, formed convexly in the direction of a central axis of the inlet opening at least in certain portions. In particular, the curved inlet face extends, in cross section, from an outer side of the housing part to an inner side of the housing part.

The boundary layer of a flow in the region of the inlet opening, in particular at the circumference of the inlet opening, is advantageously extended by virtue of the curved inlet face, in cross section, at least partially having the form of a logarithmic spiral. By means of the extension of the boundary layer, turbulence formation and dead water regions are reduced, whereby the noise emissions can be reduced or, for the same noise emissions, the pressure can for example be increased.

Suitable as a form for the surface of the inlet face in cross section is any logarithmic spiral in the case of which, with every rotation about its central point, which in this case lies in particular on a circular path around a central axis of the inlet opening, the spacing to said central point increases or decreases by the same factor. Here, "in cross section" means in any section plane that encompasses a central axis of the inlet opening. The form of the inlet face in the cross section can be described mathematically in polar coordinates $(r,\varphi)$ using the following formula:

$$r(\varphi) = a \cdot e^{k\varphi}$$

Here, k is the constant gradient of the spiral, which is non-zero. a and k are elements of the real numbers, and e is Euler's number.

The cross section is preferably of rotationally symmetrical form about the central axis over the entire circumference of the inlet opening. A portion in the cross section which has the form of a logarithmic spiral preferably extends from the outer side of the housing part to the inner side of the housing part. The portion preferably has at least two different radii.

In a first embodiment of the housing, it has proven to be particularly advantageous if provision is made whereby the logarithmic spiral is a Fibonacci spiral, in particular whereby the cross section corresponding to the logarithmic spiral—at least one portion of the inflow face in the cross section—has at least two different radii of curvature. In particular with at least two radii of curvature which relate to one another with a factor of approximately 1.618034. The curved inlet face preferably corresponds, in the cross section, to at least a part of a Fibonacci spiral, in particular with a swept center angle for the spiral of more than 90°. Mathematically, the form of the inlet face can be described in polar coordinates as follows:

$$r(\varphi) = a \cdot e^{k\varphi}$$

Here, the gradient is $$k = \frac{2 \cdot \ln(\Phi)}{\pi} \text{ and } \Phi = \frac{\sqrt{5}+1}{2}$$

The form of the Fibonacci spiral advantageously prevents a flow detachment in the region of the curved inlet face, such that the noise emissions as a result of the fluid flowing through the inlet opening to the fluid chamber in the direction of the impeller is reduced.

In a further embodiment of the housing, provision is preferably made whereby the inlet opening is, in particular on an outer side of the housing part, surrounded by a domed elevation, and whereby the curved inlet face extends at least partially on the domed elevation. The domed elevation preferably projects on the outer side of the housing part as a projection which circumferentially surrounds the inlet opening. The domed elevation has a surface which preferably has a continuous course in cross section.

The convexly curved inlet face advantageously extends at least partially on the domed elevation, in particular in a region of the domed elevation which comprises a local maximum of the domed elevation. The form of the domed elevation in the cross section preferably corresponds, at least 75%, to the form of a logarithmic spiral. By means of the domed elevation, the inlet opening is extended parallel to the central axis of the inlet opening, such that a boundary layer can form earlier. The domed elevation preferably has a height of between 3 mm and 10 mm, in particular of 6 mm, proceeding from a surface of the outer side of the housing, in particular in a direction parallel to a central axis of the inlet opening. By means of the domed elevation and the inlet face, an advantageous surface geometry is consequently formed in the region of the inlet opening, which surface geometry has the form of a logarithmic spiral, in particular of a Fibonacci spiral, in the cross section.

In a further embodiment, the stability of the housing part can advantageously be increased by virtue of the domed elevation being at least partially surrounded by a supporting structure. The domed elevation is preferably entirely surrounded by a supporting structure. The supporting structure extends on the outer side of the housing part and increases the stability thereof. The supporting structure is preferably of honeycomb-like form, such that the inlet opening is surrounded by a multiplicity of honeycomb-like portions. The honeycomb-like supporting structure extends in particular parallel to the central axis of the inlet opening. It is preferable if the height of the supporting structure—in a direction parallel to the central axis of the inlet opening—is equal to the maximum height of the domed elevation in said direction, such that the domed elevation and the supporting structure terminate in a flush manner.

In a further embodiment, it is possible in particular for the boundary layer that forms in the flow to be further enlarged in particular by virtue of the curved inlet face projecting on the housing part on the inner side of the housing part. The inlet face is consequently of lengthened form on the inner side of the housing part in the cross section so as to form a projection on the inner side. In the assembled state, the curved inlet face consequently extends circumferentially at least partially into the fluid chamber delimited by the housing part.

In a further embodiment of the housing, provision is made whereby the inlet face has at least one local guide projection, in particular whereby the local guide projection extends in a plane which encompasses a central axis of the inlet opening. It is preferable for a multiplicity of guide projections to be arranged on the inlet face, which guide projections reduce the formation of flow components in a circumferential direction.

A further embodiment of the housing furthermore provides for the inlet face to have at least one recess extending over a part of the circumference of the inlet opening. The recess is preferably formed so as to locally reduce the height of the domed elevation and/or to locally enlarge the clear cross section of the inlet opening. The noise emissions are additionally reduced by means of the recess.

The object stated in the introduction is furthermore achieved in the case of a generic housing through the various embodiments in that at least one guide element extends from the inlet face in the direction of a central axis of the inlet opening. The guide element is designed so as to influence the flow of the entering fluid in a predetermined manner, for example the direction thereof. The guide element is designed and configured to influence the flow. The guide element extends from the inlet face in the direction of the central axis of the inlet opening and is supported for example with a support element on the inlet face, in particular on the opposite side on the circumference. Provision is also made whereby the guide element extends beyond the central axis to the opposite side.

This exemplary embodiment could also be referred to as involving two guide elements which each extend in the direction of the central axis and which meet and are supported on one another at the central axis.

One refinement of the housing provides for an inlet ring which at least partially covers the inlet opening to be held by means of the guide element, preferably by means of two guide elements, on the housing part. The flow entering through the inlet opening is in this case influenced both by the inlet ring and by the guide element. The guide element extends in a radial direction between the inlet face and the inlet ring. The largest diameter of the inlet ring is preferably smaller than or equal to the smallest diameter of the inlet opening. For example, two guide elements are arranged opposite one another or offset with respect to one another over the circumference.

In one refinement, it has proven to be particularly advantageous if at least one guide element, preferably all guide elements, have at least one guide face with an at least two-dimensional extent. The guide face serves for diverting the flow, in particular for realizing a change in direction. For example, a guide element has two guide faces which are preferably arranged opposite one another—opposite surfaces of the guide element. In particular, the at least one guide face is curved, and it is preferable for both guide faces to be curved. For example, the curved shape corresponds to the form of a logarithmic spiral, preferably of a Fibonacci spiral with at least two different radii of curvature. Provision is advantageously furthermore made whereby the guide face is inclined relative to a central axis of the inlet opening in a circumferential direction. This means that the guide face is arranged such that a flow is diverted at least partially into a tangential and/or circumferential direction of a circular path around the central axis.

In a further embodiment of the housing, provision is preferably made whereby more than two guide elements, in particular between five and ten guide elements, are provided, preferably whereby the guide elements are arranged uniformly or asymmetrically over the circumference of the inlet face. In the case of a uniform arrangement, the spacing over the circumference—in particular the center angle—between all guide elements is identical.

For example in the case of an unchanging volume flow and unchanging noise emissions, the guide elements increase the pressure that can be generated by a radial fan with a housing of said type. The guide element or the guide elements simultaneously perform the function of a covering grille for the inlet opening and prevent an ingress of solids of a particular size.

In the case of an asymmetrical arrangement, the spacing—the center angle—between the guide elements varies over the circumference. In a polar coordinate system which lies on the outer side of the housing part and the pole of which coincides with a central axis of the inlet opening and the pole axis of which is orthogonal with respect to the central axis of an outlet opening, the guide elements are arranged closer together—the center angles between the guide elements are smaller—in an angle range between 90° and 250°, in particular 90° and 180°—the pressure region—, than in an angle range between 250° and 360°. In the case of a non-uniform spacing of the guide elements to one another, the perceptible noise emissions can advantageously be further reduced.

In one refinement, provision is very particularly advantageously made whereby at least a proportion of the guide elements is spaced apart over the circumference of the inlet face with spacings—center angles—which relate to one another in accordance with the Fibonacci sequence. Owing to excessively small spacings, it is for example the case that the first elements of the Fibonacci sequence are not taken into consideration, such that, preferably, the first spacing or center angle between a first and a second guide element corresponds to the seventh element of the Fibonacci sequence, that is to say the number 13, and consequently the first center angle amounts to 13°. All subsequent guide elements over the circumference are spaced apart such that the spacing—the center angle—is formed in each case from the sum of the two preceding spacings. In particular, the spacing between a first and a second guide element begins with a center angle of 13°, resulting in a center angle of) 21° (13°+8°) between the second and third guide element. The subsequent center angles are likewise determined in each case from the sum of the two preceding center angles.

In particular, provision is made whereby the guide faces are spaced apart from one another over the circumference most closely in the region in which the pressure region is situated on the inner side of the housing part, in the fluid chamber, in particular in the above-described angle range between 90° and 180° in the polar coordinate system. This is the region that is arranged under the tongue of the radial fan.

The pressure that can be attained with unchanged noise emissions can advantageously be further increased in that, in a further refinement, provision is made whereby the inlet ring has a surface which is oriented in the direction of the circumference of the inlet opening and which has a cross section which at least partially has the form of a logarithmic spiral, in particular of a Fibonacci spiral, and/or whereby the inlet ring has a surface which is averted from the circumference of the inlet opening and which has a cross section which at least partially has the form of a logarithmic spiral, in particular of a Fibonacci spiral. In this way, the flow attaches to the inlet ring with an advantageous boundary layer in the region of the inlet opening. The surfaces of the inlet ring are those surfaces which are oriented substantially in the same way as the inlet face.

It is preferable if both the inside surface—in cross section—and the outside surface—in cross section—of the inlet ring are almost entirely formed so as to have the form of a Fibonacci spiral, in particular with at least two different radii.

Particularly advantageous results can be achieved if the exemplary embodiments of the above-described solution according to the invention are combined with the solution according to the invention described immediately above, that is to say if for example an inlet ring with guide elements is combined with an inlet face which, in terms of its form, is curved in accordance with a logarithmic spiral.

The object stated in the introduction is furthermore achieved in the case of a generic housing through the additional embodiments in that an encircling set-back structure which at least partially circumferentially surrounds the inlet opening, and/or an encircling projection which at least partially surrounds the inlet opening, is formed on an inner side of the housing part, in particular in that the encircling set-back structure and/or the encircling projection has a cross section which varies at least in certain portions, preferably at least once, over the circumference.

The encircling set-back structure and/or the encircling projection is formed on the inner side of the housing part, such that, in the assembled state, it is a part of the fluid chamber or, in the case of the encircling projection, projects into the fluid chamber. The cross section of the encircling set-back structure is preferably substantially U-shaped. The encircling set-back structure is formed as a recess which is at least partially set back in relation to the inner side of the housing part, in particular in a direction parallel to a central axis of the inlet opening, and which extends along the circumference of the inlet opening. The encircling projection is formed as a domed elevation which at least partially projects forward in relation to the inner side of the housing part, in particular in a direction parallel to a central axis of the inlet opening, and which extends along the circumference of the inlet opening. Preferably, the encircling set-back structure and/or the encircling projection directly adjoins the inlet opening in a radial direction. Provision is for example made whereby an encircling projection extends over one part of the circumference and an encircling set-back structure extends over another part of the circumference.

In particular, provision is made whereby, in the exemplary embodiments with the domed elevation, the encircling set-back structure is arranged within the domed elevation, such that, with an approximately constant wall thickness of the housing part, a domed elevation and an encircling set-back structure are formed simultaneously. For example, the encircling set-back structure has a constant cross section over the entire circumference. By means of the encircling set-back structure and/or the encircling projection, the flow characteristics of the housing part in the region of the inlet opening are improved; in particular, with unchanged noise emissions and at volume flows above 2.5 liters per second, the pressure is increased. The encircling set-back structure advantageously prevents the backflow of fluid.

Provision is made whereby the encircling set-back structure and/or the encircling projection has a cross section which varies at least in certain portions along the circumference. The cross section, that is to say in particular the height or width of the encircling set-back structure or of the encircling projection, vary at least over the circumference at least at one point. The encircling projection is in particular formed in one piece with the housing part.

In a first embodiment, it has proven to be particularly advantageous if the encircling set-back structure has a basic cross section in at least one first arc segment on the circumference, and has a varying fill cross section in at least one second arc segment, in particular that the fill cross section extends over an arc segment with a center angle of between 1° and 359°.

The basic cross section is in particular the cross section with the greatest clear width and clear height of the encircling set-back structure over the circumference. The clear cross section in the fill cross section is reduced in relation to the basic cross section, wherein the degree of the reduction may vary over the arc segment of the fill cross section. The fill cross section is preferably arranged on the circumference in such a way which is situated below the tongue of the radial fan and below the outlet opening.

In a further embodiment, provision is furthermore made whereby the encircling set-back structure has a free basic area—clear cross section—in the basic cross section, and whereby the free basic area is reduced at least in certain portions in the fill cross section. For example, the basic cross section has a basic height, wherein the basic height is reduced in the fill cross section. The basic height is preferably the height of the clear cross section of the encircling set-back structure parallel to the central axis of the inlet opening between the deepest point of the encircling set-back structure in the cross section and the highest point of the encircling set-back structure at the transition to the delimitation of the inlet opening.

The reduction of the basic height in the fill cross section can advantageously be stated as a percentage reduction in relation to the basic height in the basic cross section, wherein, in particular, the basic height can be reduced in certain portions to 0. Provision is made in particular whereby, over the circumference, the basic height is reduced by 100% at at least one or at least two points, that is to say the fill cross section has one or two regions with maximum filling of the encircling set-back structure.

In a further embodiment of the housing, it has proven to be advantageous if provision is made whereby, in a polar coordinate system which lies against the inner side of the housing part and the pole of which coincides with a central axis of the inlet opening and the pole axis of which is orthogonal with respect to a central axis of an outlet opening of the housing, the fill cross section extends in an angle range between 120° and 360°, in particular between 135° and 358°. The fill cross section is consequently arranged in a region which is arranged partially in the region of the outlet opening and predominantly below the outlet opening, such that the fill cross section is arranged substantially in that region of the radial fan in which the build-up of pressure occurs.

In a further embodiment of the housing, provision is furthermore made whereby the fill cross section has, in particular in a radial direction, a continuous or discontinuous profile. The profile of the fill cross section is the region of the transition of the encircling set-back structure to the fluid chamber in the cross section. In particular, the profile extends over the width—in a radial direction—of the encircling set-back structure in the cross section. The profile in the cross section is in particular of linear, arcuate and/or stepped form.

One refinement of the housing provides for the encircling projection to extend in at least one projection arc segment along the circumference, in particular for the projection arc segment to have a center angle between 1° and 359°, in particular 220°. In particular, the encircling projection consequently does not extend along the entire circumference but only over a part of the circumference, the projection arc segment. The projection arc segment has in particular a center angle of approximately 220° and is arranged in the pressure region of a radial fan.

In a further embodiment, this means in particular that, in a polar coordinate system which lies against the inner side of the housing part and the pole of which coincides with a central axis of the inlet opening and the pole axis of which is orthogonal with respect to the central axis of an outlet opening, the projection arc segment extends in an angle range between 120° and 360°, in particular in an angle range between 135° and 355°.

Furthermore, in one refinement, provision is made whereby the encircling projection has a cross section which varies over its extent. For example, the encircling projection has a cross section which decreases continuously in both circumferential directions proceeding from a maximum cross section.

In particular in the case of multi-part embodiments, it has, in one refinement, proven to be advantageous for the encircling projection to be at least partially inset into the housing part. In the case of such an embodiment, the encircling projection is for example inserted as a separate part into a recess provided for it on the housing part, and is fastened to the housing part. In this way, it is possible to realize more uniform transitions between encircling projection and housing part.

It has furthermore proven to be particularly advantageous to combine the features of the above-stated solutions according to the invention with one another, such that the best results are achieved for example with a housing in the case of which the inflow face has the form of a Fibonacci spiral, the inlet ring is likewise formed with Fibonacci surfaces, and an encircling set-back structure with fill cross section is present on the inner side. A first housing part according to the invention may advantageously be joined together with a known second housing part to form a housing according to the invention.

The housing is preferably used for a radial fan, having at least one fan wheel, wherein the fan wheel can be driven by a drive means, and wherein the fan wheel is arranged rotatably in the housing. A radial fan with a housing of said type is particularly preferably suitable for the air-conditioning of a vehicle seat.

In detail, there are now numerous possibilities for developing and refining the housing. In this regard, reference is made both to the dependent patent claims subordinate to the independent patent claims, and to the following description of preferred exemplary embodiments in conjunction with the drawing.

Figure 10A:
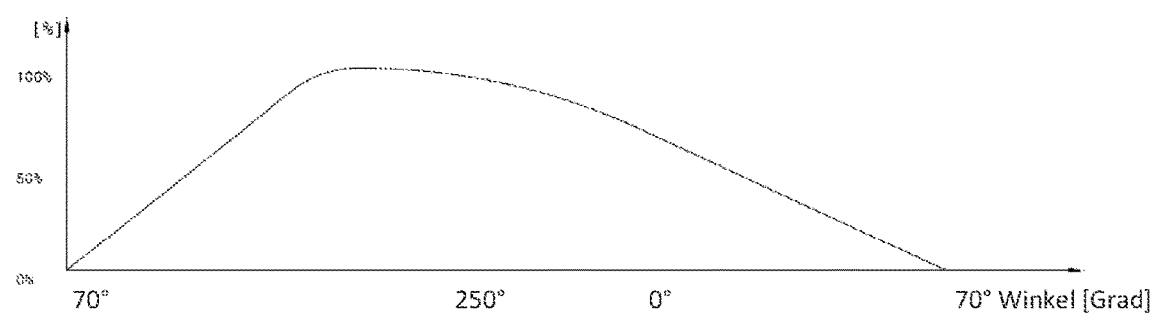
Figure 10B:
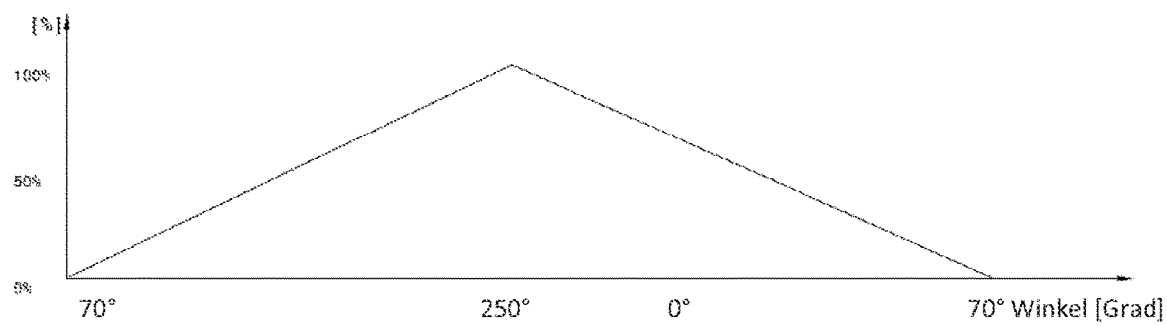
Figure 10C:
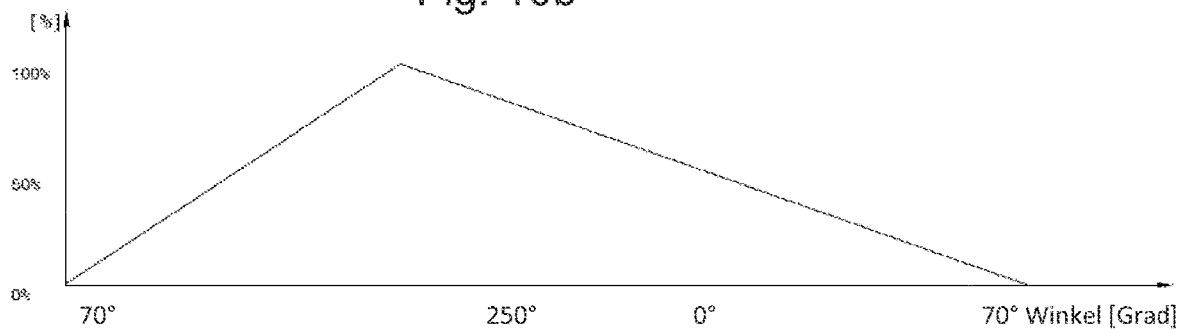
Figure 10D:
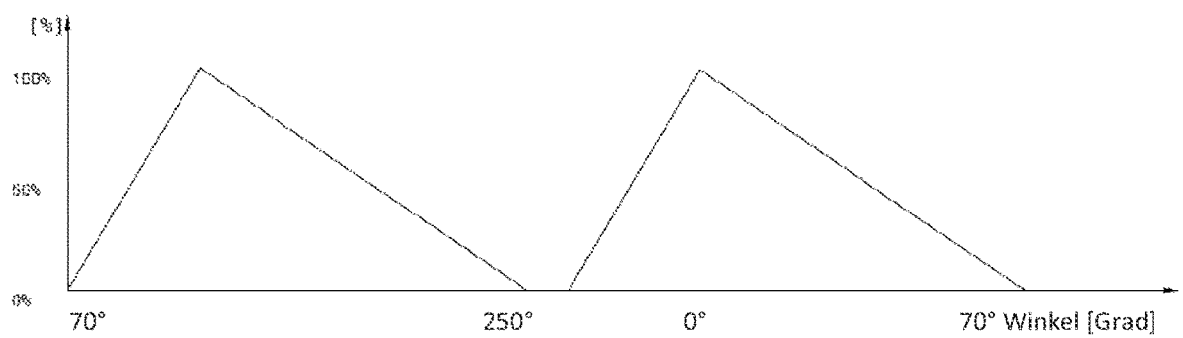
Figure 10E:
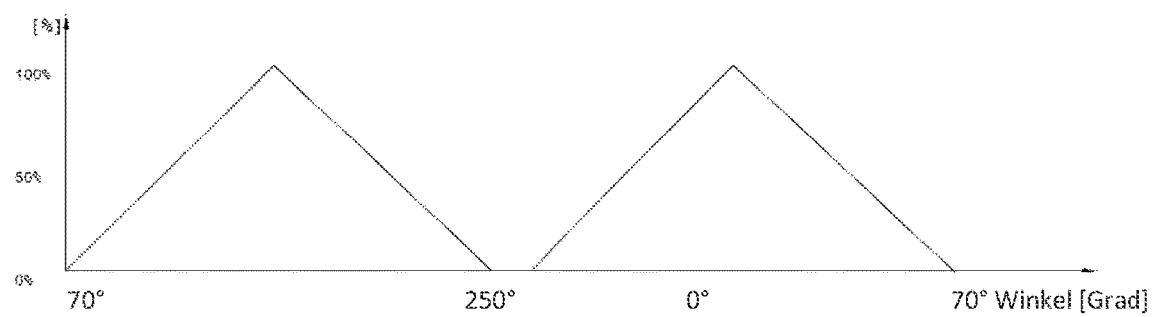
Figure 10F:
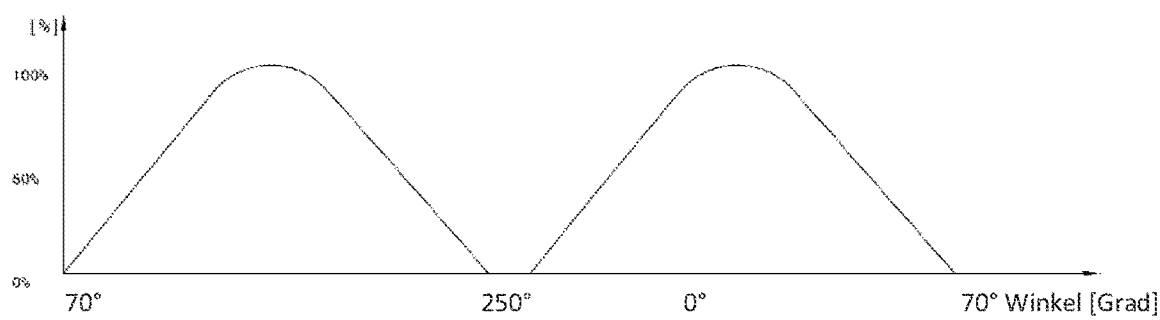
Figure 10G:
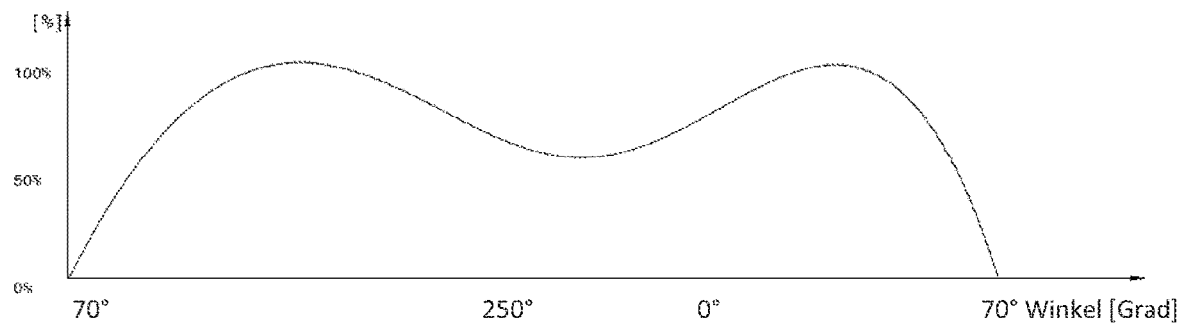
Figure 10H:
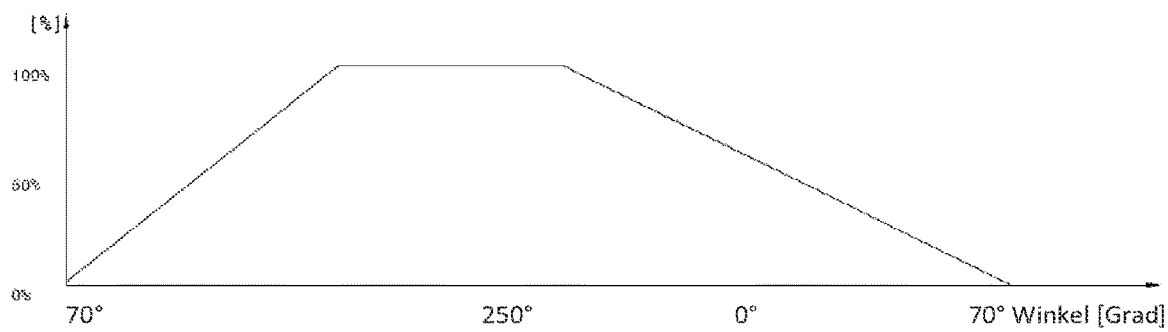
Figure 11:
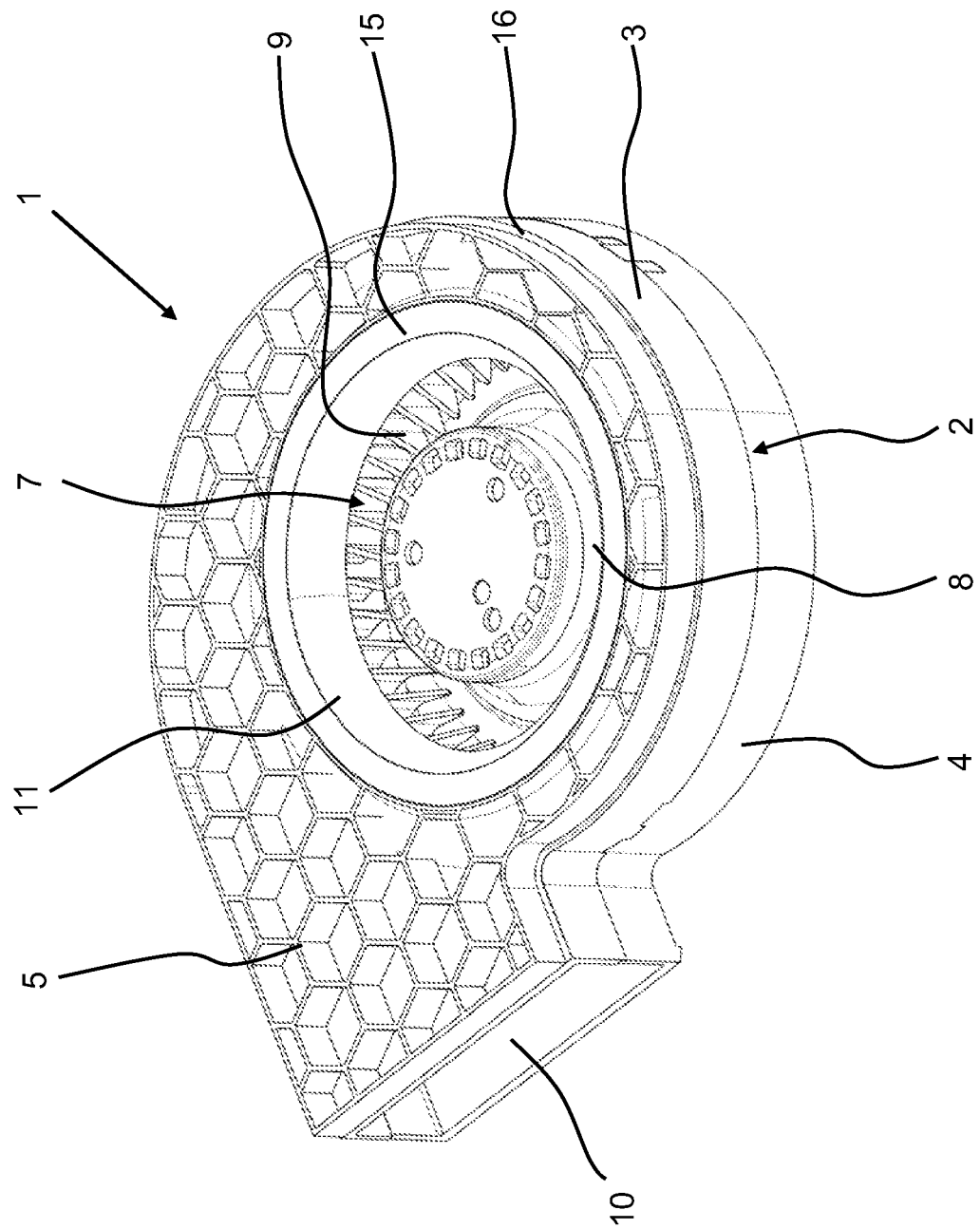
Figure 12:
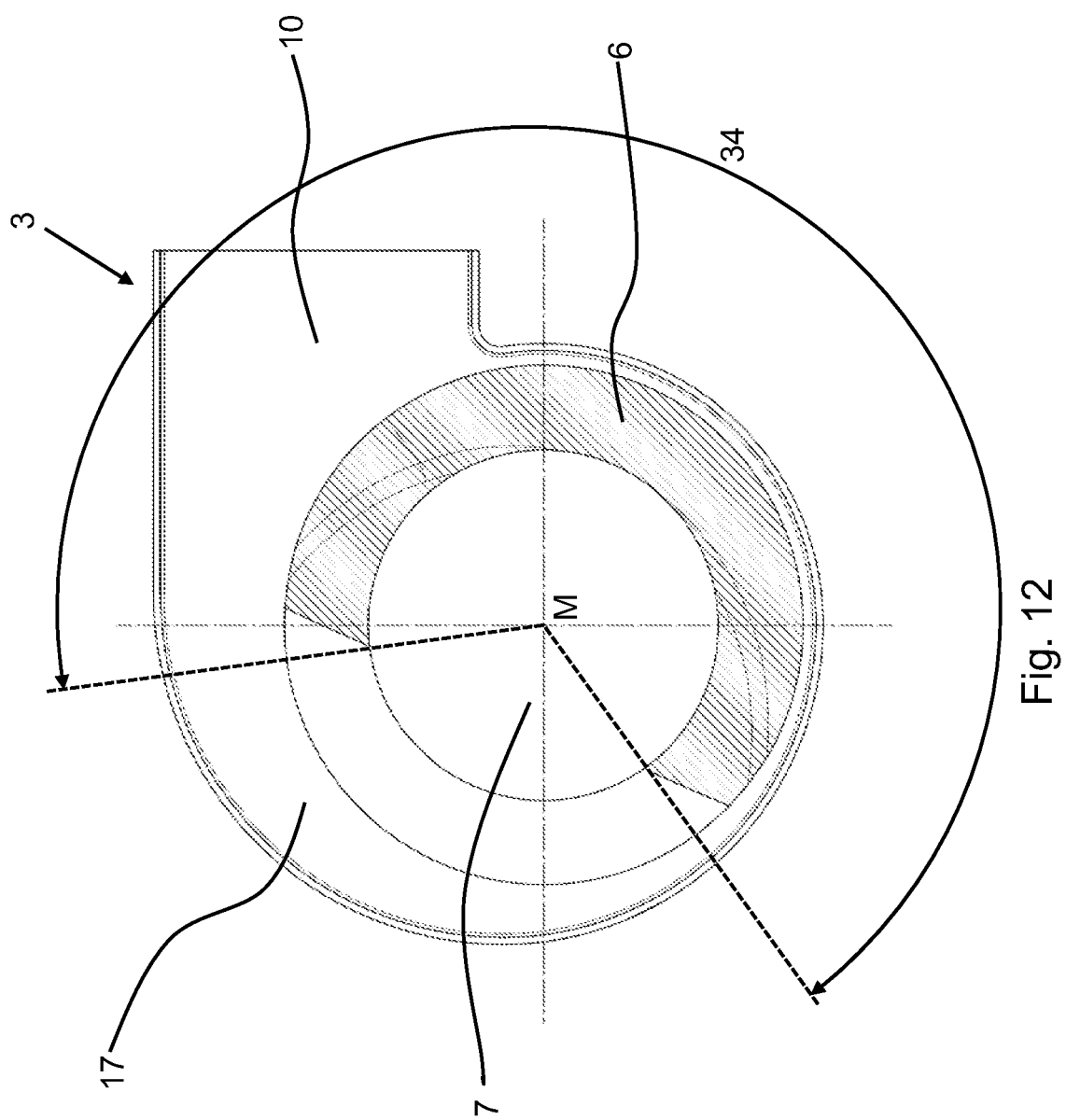
Figure 13:
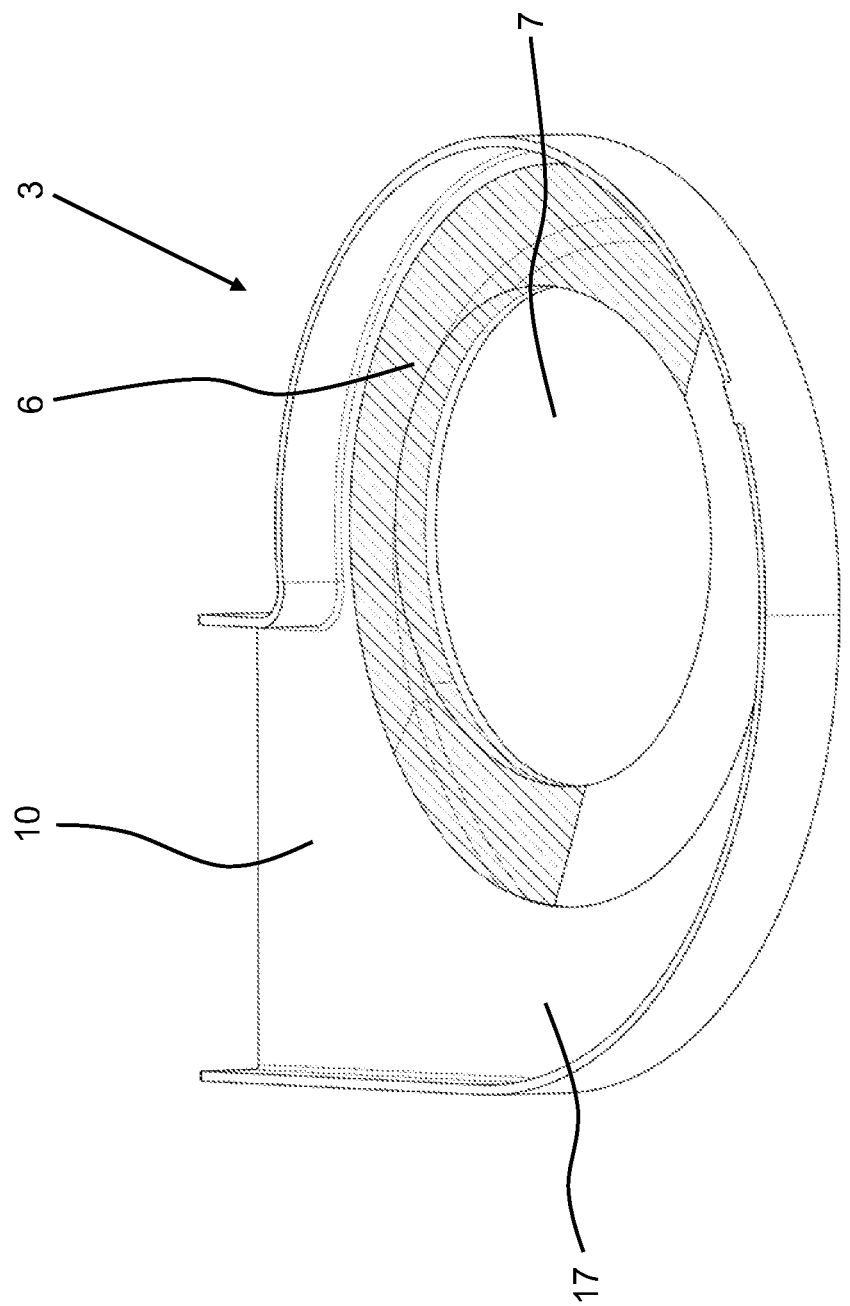
Figure 14A:
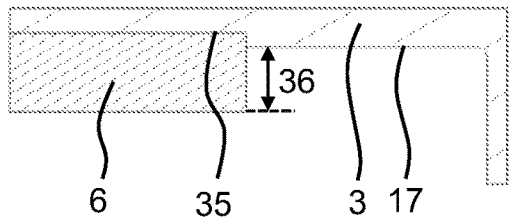
Figure 14B:
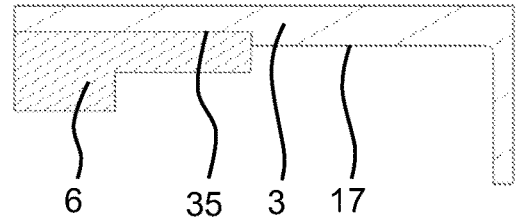
Figure 14C:
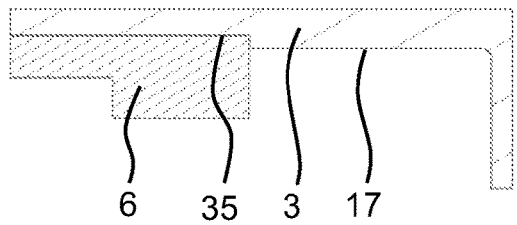
Figure 14D:
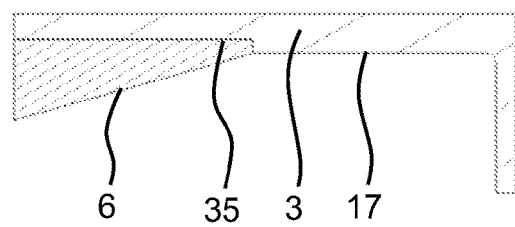
Figure 14E:
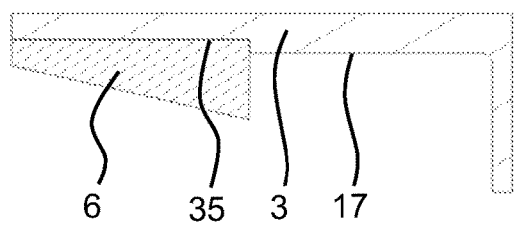
Figure 14F:
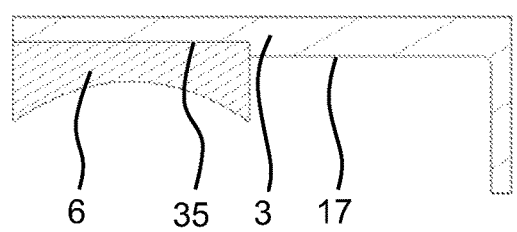
Figure 14G:
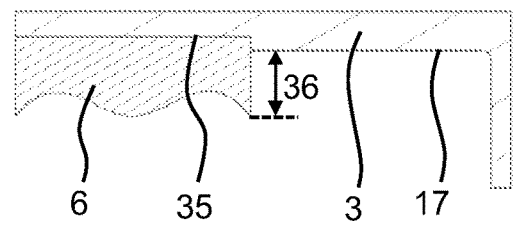
Figure 14H:
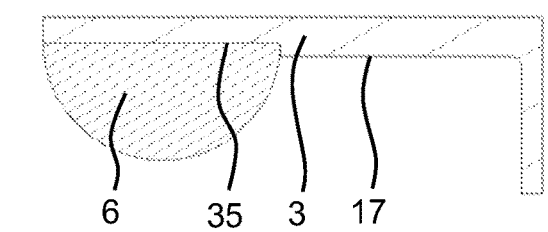
Figure 15A:
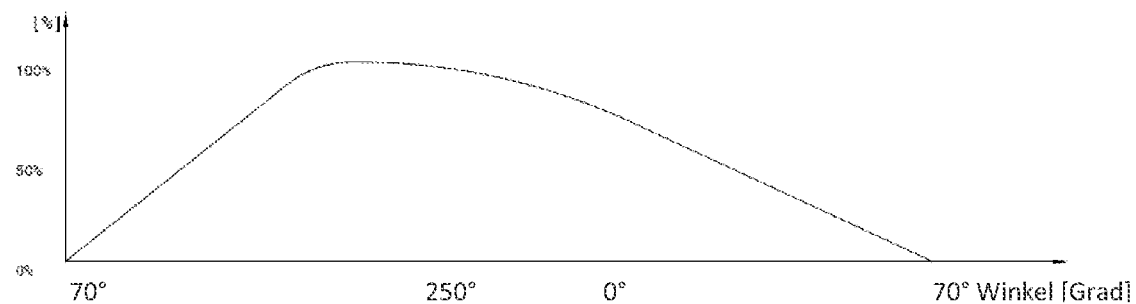
Figure 15B:
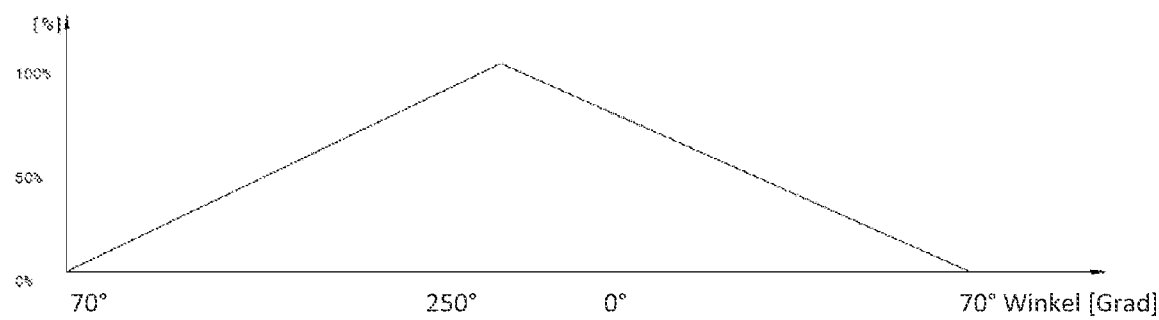
Figure 15C:
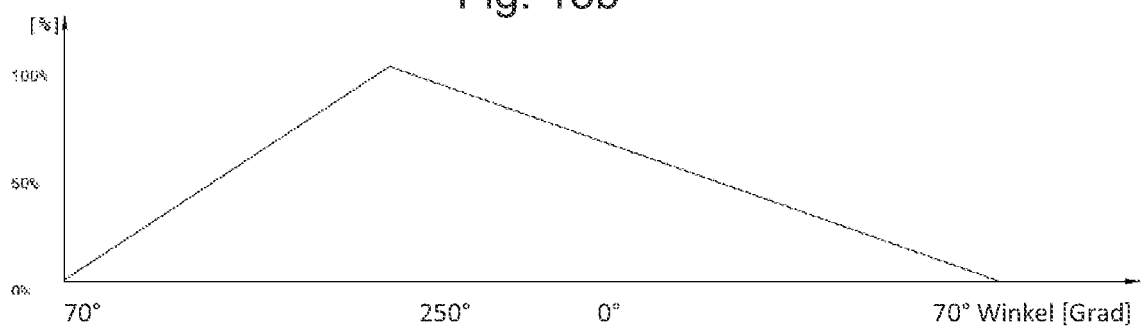
Figure 15D:
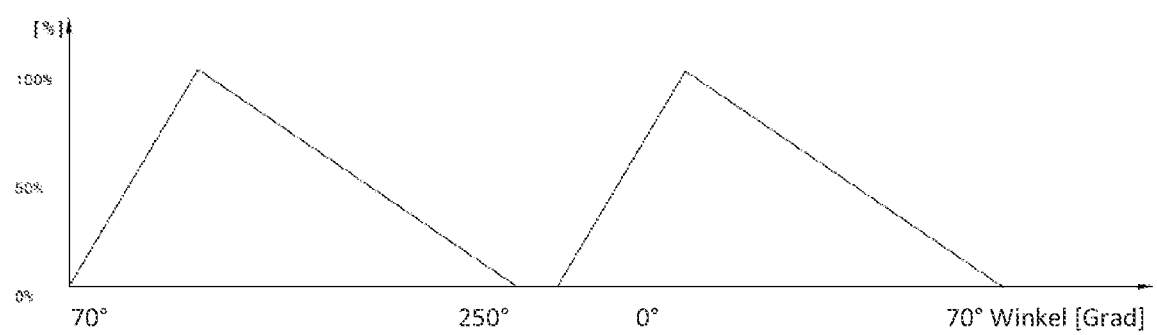
Figure 15E:
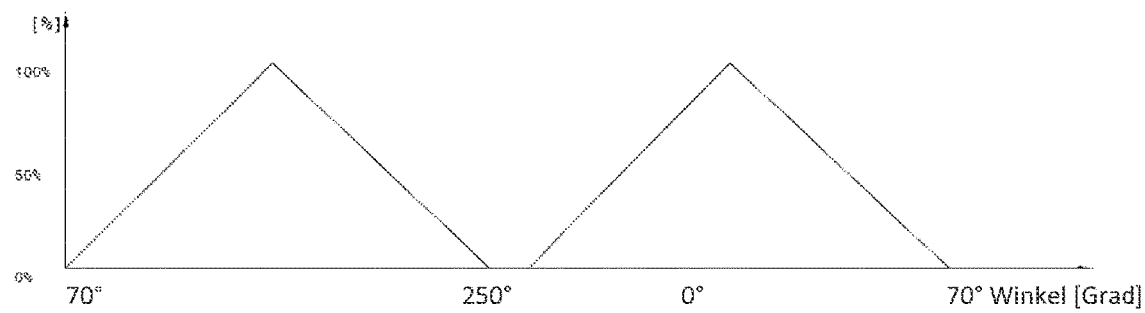
Figure 15F:
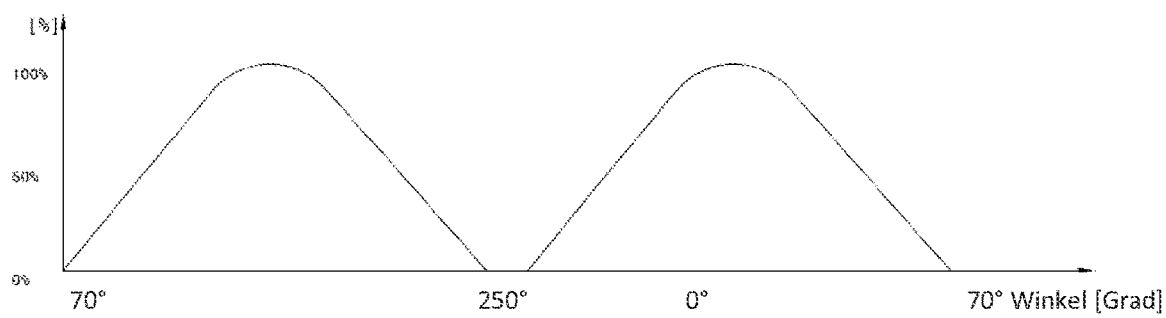
Figure 15G:
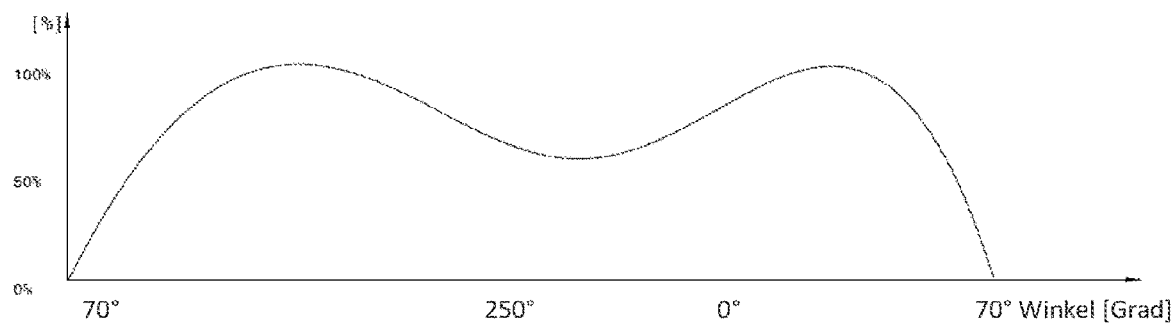
Figure 15H:
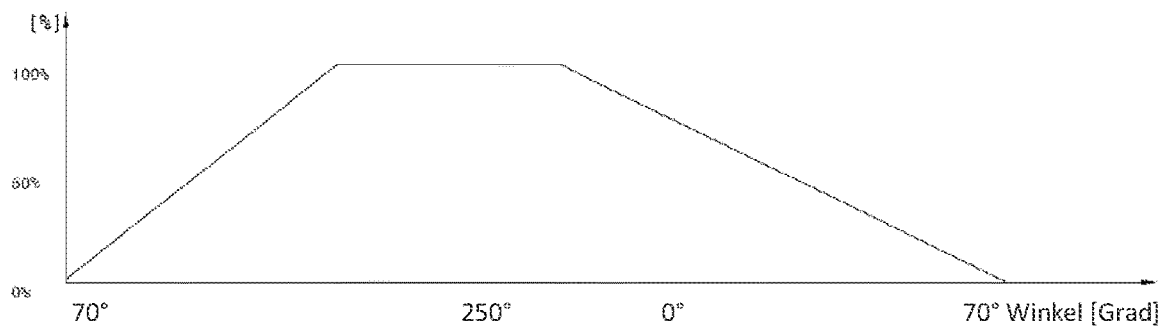

FIGS. 9*a* to *g* show exemplary embodiments of fill cross sections,

FIGS. 10a to h show exemplary embodiments of circumferential courses of the fill cross section, FIG. 11 shows a radial fan with an exemplary embodiment of a housing, FIG. 12 shows an exemplary embodiment of a housing part, FIG. 13 shows the housing part as per FIG. 12, FIGS. 14a to h show exemplary embodiments of cross sections of the encircling projection, and FIGS. 15a to h show exemplary embodiments of circumferential courses of the encircling projection.

Figure 1:
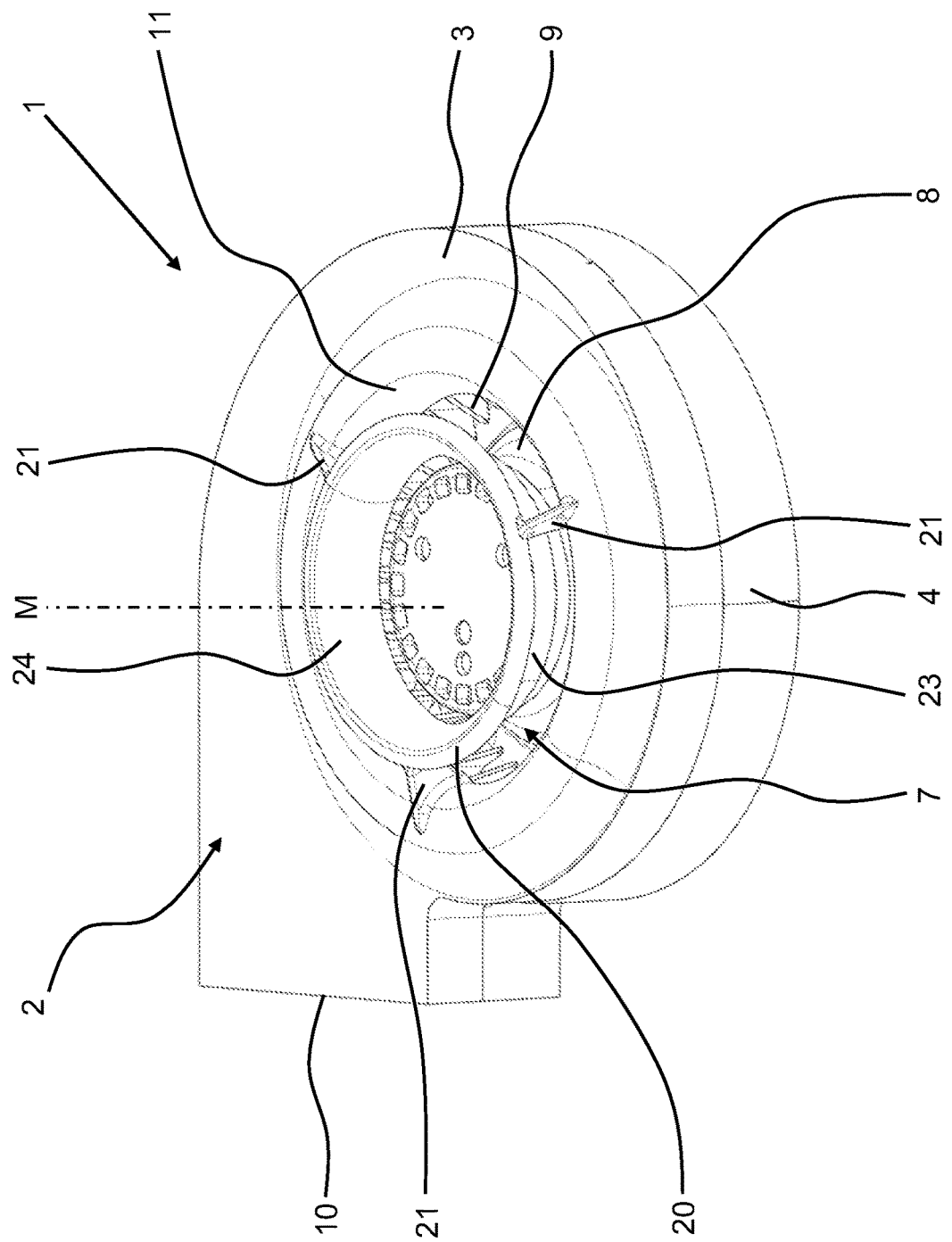
FIG. 1 shows a radial fan with an exemplary embodiment of a housing.

FIG. 1 shows an exemplary embodiment of a housing 1 for an illustrated radial fan 2. In this exemplary embodiment, the housing 1 comprises a first housing part 3 and a second housing part 4. The first housing part 3 and the second housing part 4 are connected to one another. The housing part 3 has an inlet opening 7 through which a fluid, for example air, can flow into a fluid chamber 8 in which a fan wheel 9 is rotatably held. The housing 1 furthermore has an outlet opening 10 through which the fluid exits the radial fan 2 again at a higher pressure. The inlet opening 7 has, at its circumference, a curved inlet face 11 which, in this exemplary embodiment, is convexly curved in the direction of the central axis M of the inlet opening 7.

Figure 2:
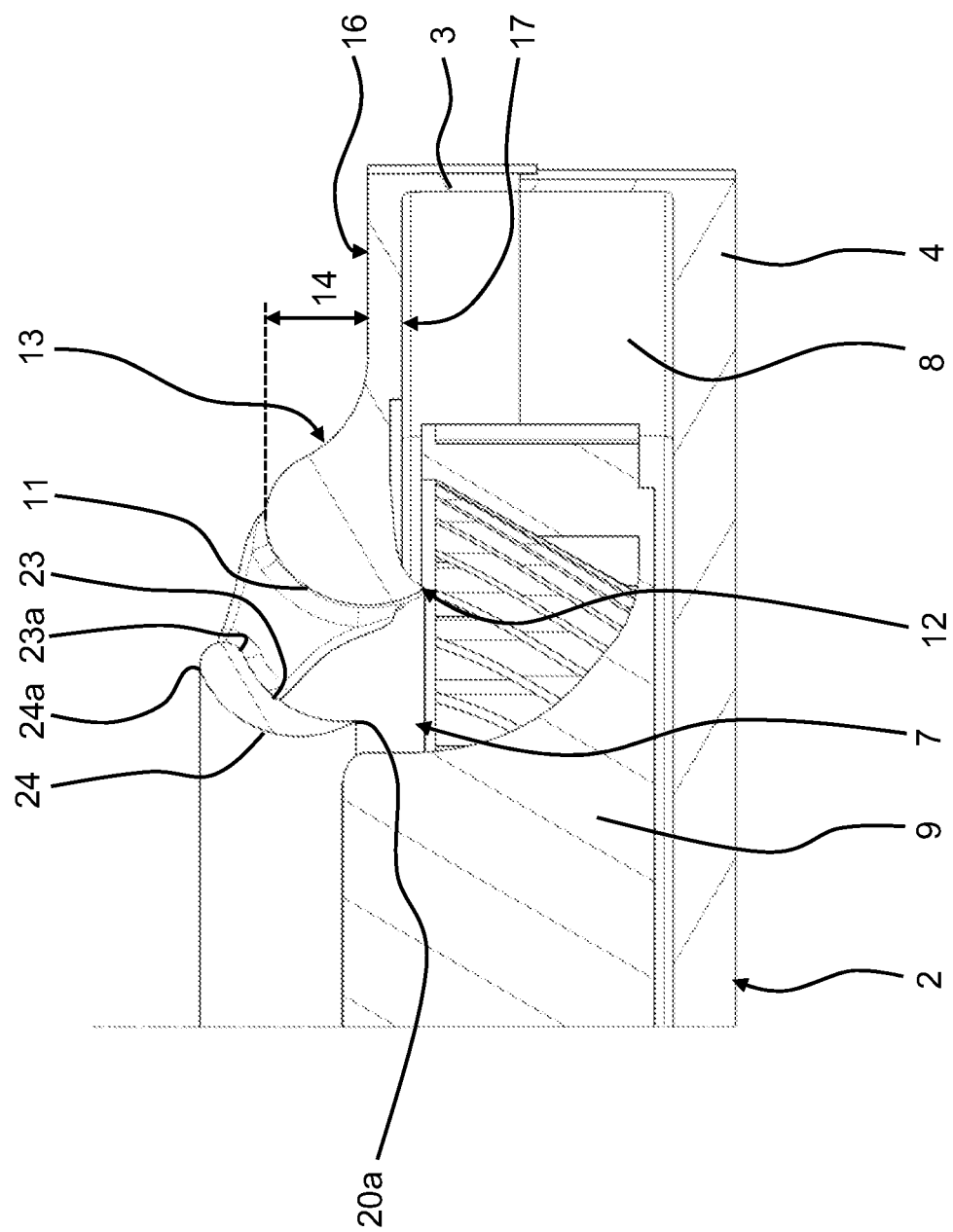
FIG. 2 shows a section through the exemplary embodiment as per FIG. 1.

FIG. 2 shows a section through the exemplary embodiment as per FIG. 1 in a plane which fully encompasses the central axis M of the inlet opening 7. The fan wheel 9 is held rotatably within the fluid chamber 8 between the first housing part 3 and the second housing part 4. The curved inlet face 11 which surrounds the inlet opening 7 over the full circumference is formed, in a portion between an end 12 of the inlet face 11 within the fluid chamber 8 and approximately the midpoint 13, of a height 14, of a domed elevation 15, as a Fibonacci spiral with three different radii of curvature. The inlet face 11 extends, in part, on the domed elevation 15.

The domed elevation 15 surrounds the inlet opening 7 along the entire circumference and protrudes from an outer side 16 of the housing part 3 in a direction parallel to the central axis M (see FIG. 1). The domed elevation 15 has, over its entire extent, a continuous course in cross section, in particular including the inlet face 11. On an inner side 17 of the housing part 3, the curved inlet face 11 likewise protrudes by way of its end 12.

Figure 3:
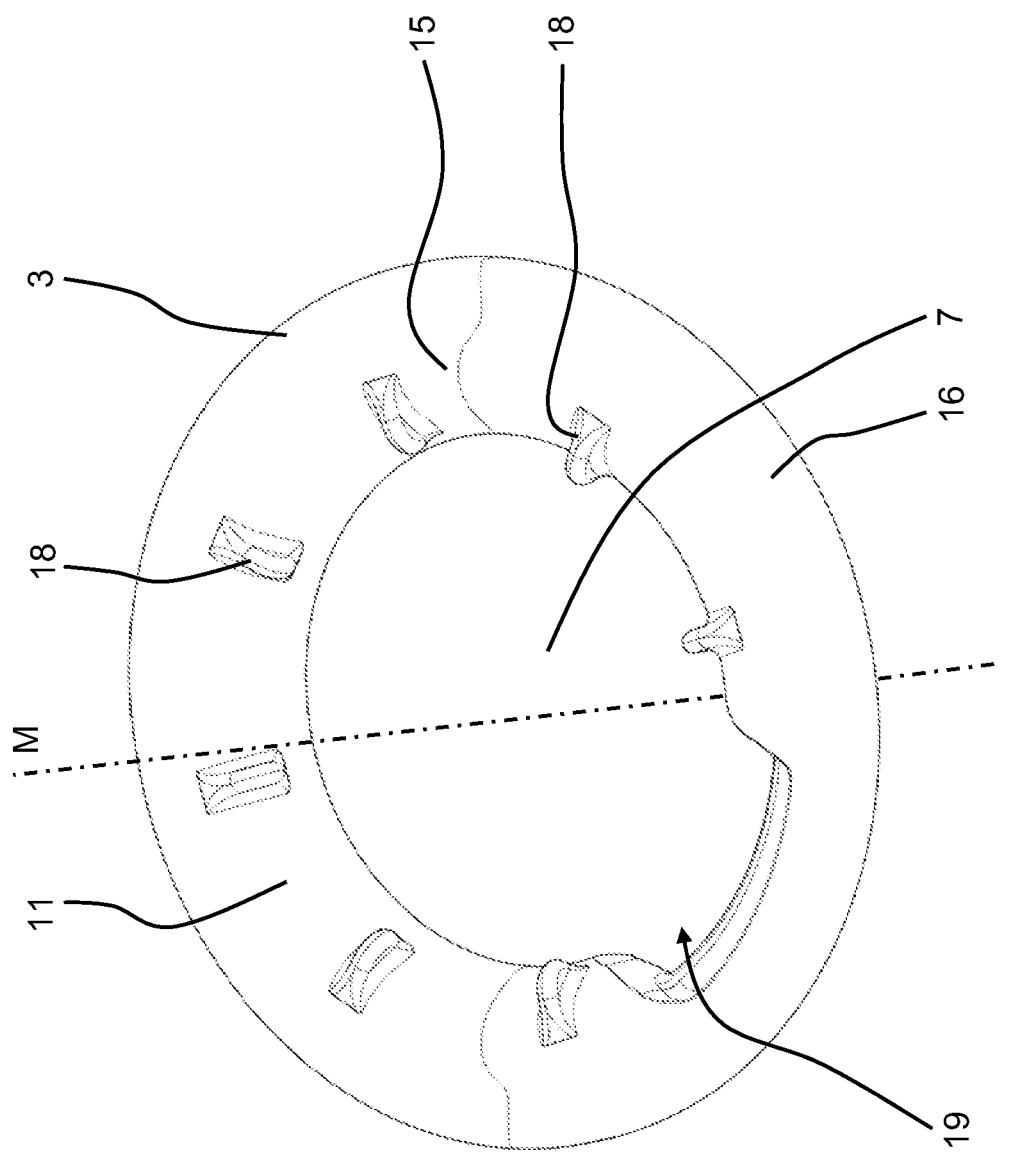
FIG. 3 shows an exemplary embodiment of a housing part.

FIG. 3 shows an exemplary embodiment of a housing part 3 in a perspective view. The housing part 3 is designed as a covering ring of a housing 1. The inlet opening 7 has a curved inlet face 11 which extends at least partially on a domed elevation 15. The domed elevation 15 projects out of the outer side 16 in a direction parallel to the central axis M. A multiplicity of guide projections 18 are arranged in the inlet face 11, wherein the guide projections 18 each extend substantially in a plane which comprises the central axis M of the inlet opening 7, that is to say which are not inclined relative to the central axis M. In particular, the noises generated by the radial fan 2 are further reduced by means of a recess 19 in the domed elevation 15 and/or in the inlet face 11. The recess 19 extends over a part of the circumference.

Figure 4:
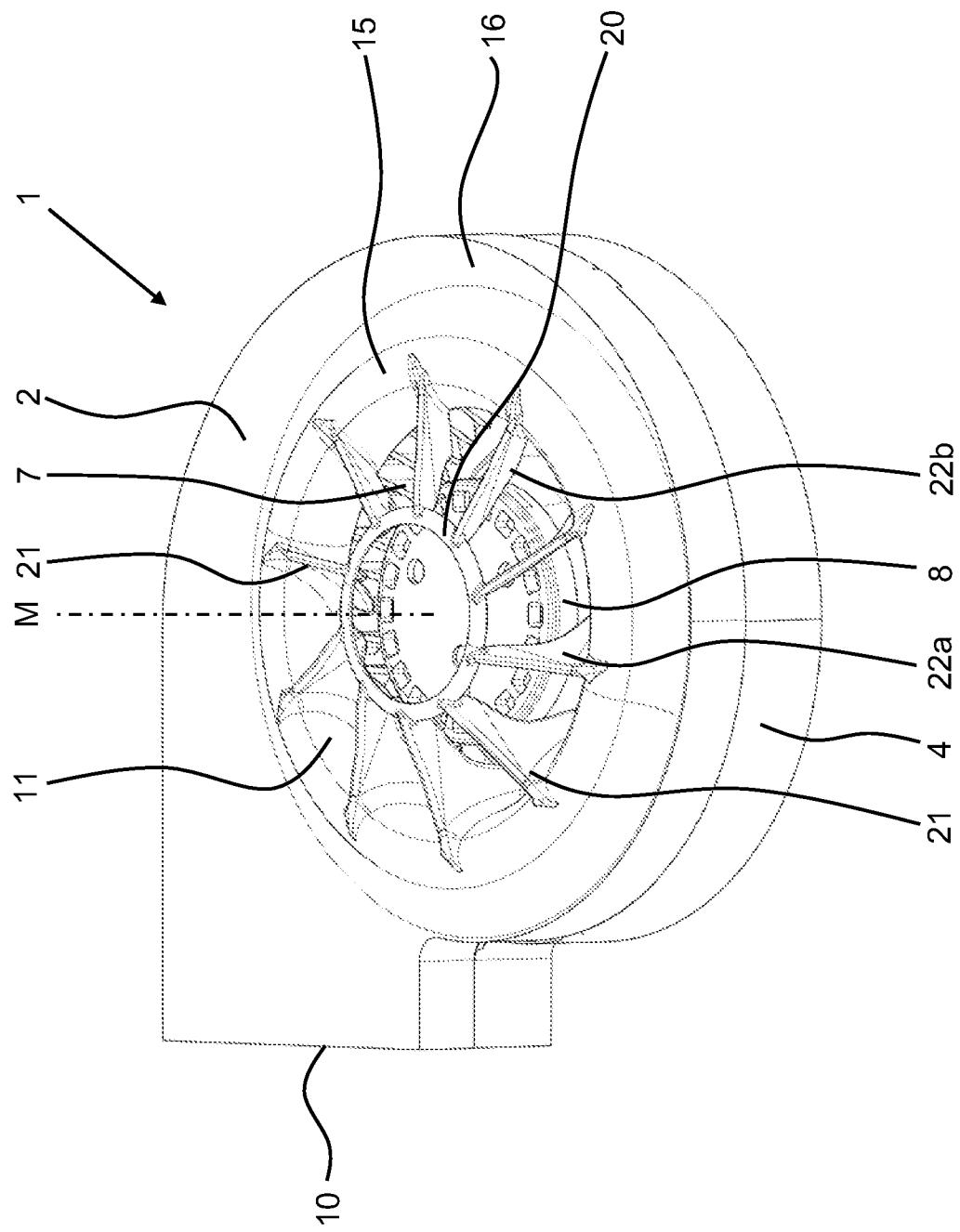
FIG. 4 shows a radial fan with an exemplary embodiment of a housing.

FIG. 4 shows a radial fan 2 with an exemplary embodiment of a housing 1 in a perspective view. In this exemplary embodiment, the housing part 3 has an inlet ring 20 which at least partially covers the inlet opening 7. The exemplary embodiment in FIG. 1 likewise shows an inlet ring 20. The inlet ring 20 is held on the housing part 3 by ten guide elements 21 in FIG. 4 and is held on the housing part 3 by three guide elements 21 in FIG. 1. The guide elements 21 have a first guide face 22a and a second guide face 22b with an at least two-dimensional extent. In FIG. 4, the guide faces 22a and 22b are inclined relative to the central axis M. In FIG. 1 and FIG. 4, the guide elements are uniformly distributed and spaced apart from one another on the circumference surrounding the inlet opening 7. The guide elements 21 are arranged on the inlet face 11 and extend in a radial direction in the direction of the inlet ring 20.

Figure 5:
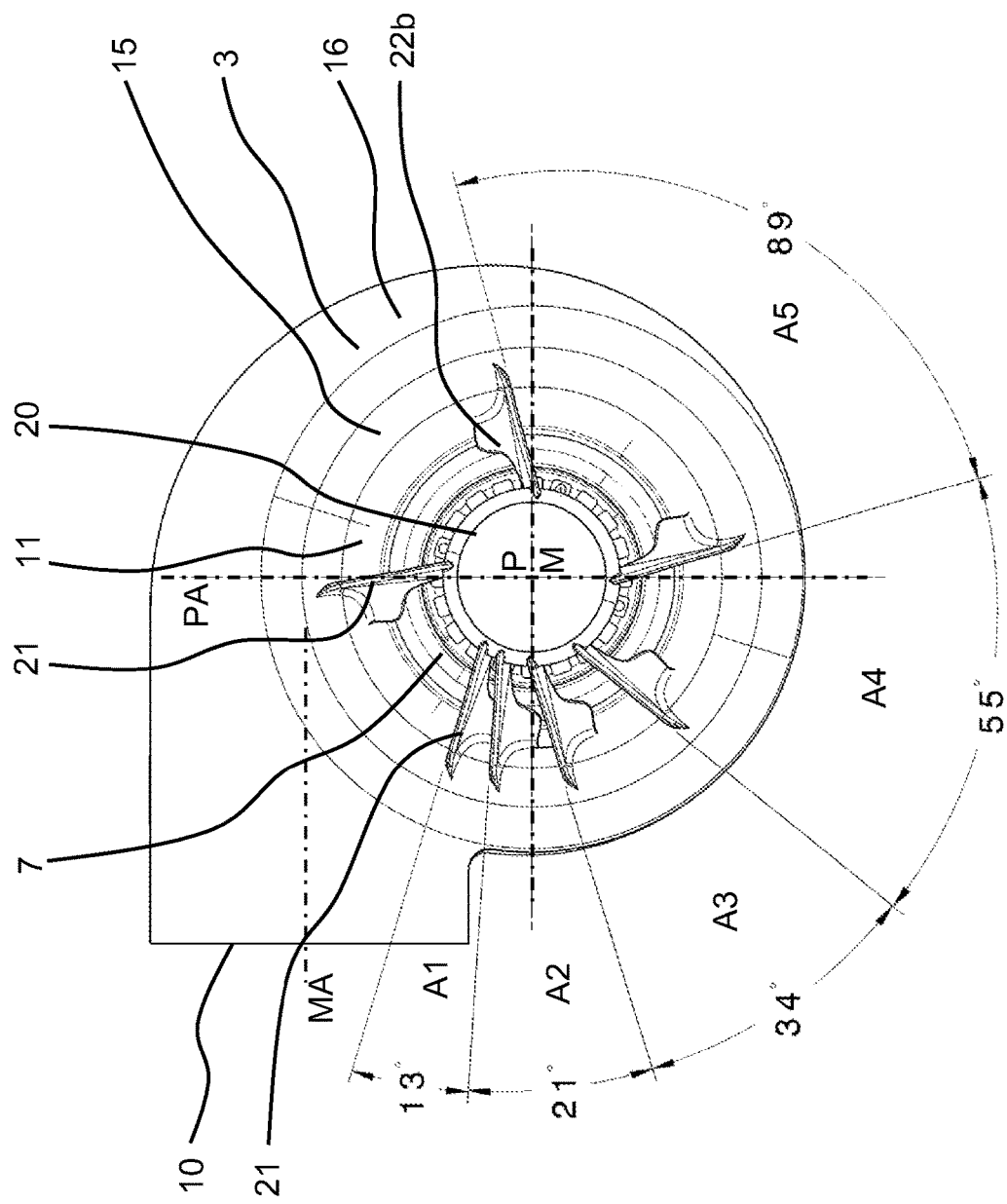
FIG. 5 shows an exemplary embodiment of a housing.

FIG. 5 shows an exemplary embodiment of a housing 1 from the outer side 16. The housing 1 has an inlet ring 20 which is held on the housing part 3, so as to partially cover the inlet opening 7, by seven guide elements 21. A proportion of the guide elements 21 are spaced apart from one another on the circumference of the inlet opening 7 or of the inlet face 11 such that the spacings A1 to A5—the center angles—relate to one another in accordance with the Fibonacci sequence. This means that, proceeding from a first spacing A1, which is based on a center angle of 13°—as the seventh element of the Fibonacci sequence—, and a spacing A2, which is based on a center angle of 21°—as the sum of 8° and 13°—, the following spacings correspond in each case to the sum of the two preceding spacings or center angles. Consequently, the center angle of the spacing A3 is the sum of the center angles of A1 and A2, and the center angle of A4 is the sum of the center angles of A2 and A3, and the center angle of A5 is the sum of the center angles of A3 and A4. By means of the illustrated non-uniform distribution of the guide elements 21 on the circumference, the pressure can be increased while maintaining the same noise generation, in particular in the case of volume flows between two and four liters per second.

In FIG. 5, in a polar coordinate system which lies against the outer side 16 of the housing part 3 and the pole P of which coincides with the central axis M of the inlet opening 7 and the pole axis PA of which is orthogonal with respect to the central axis MA of the outlet opening 10, the first guide element 21 is arranged with the spacing A1 to the second guide element 21 approximately at an angle of 90°.

In the exemplary embodiment of FIG. 1 and FIG. 2, the inlet ring 20 has a surface 23 which is oriented in the direction of the inlet face 11 and which, in the cross section illustrated in FIG. 2, has, in part, in particular specifically between an end 20a and a portion end 23a prior to the change in the sign of the curvature of the face in the cross section, the form of a Fibonacci spiral. Furthermore, in the cross section, a surface 24, which is averted from the inlet face 11, of the inlet ring 20 also has, in part, in particular specifically between the end 20a and a portion end 24a at the transition into the end face of the inlet ring, the form of a Fibonacci spiral, in particular with at least two different radii. By means of such a design of the inlet ring 20, it is possible for the pressure of the radial fan 2 to be increased while maintaining the same noise generation in the case of virtually all volume flows.

Figure 6:
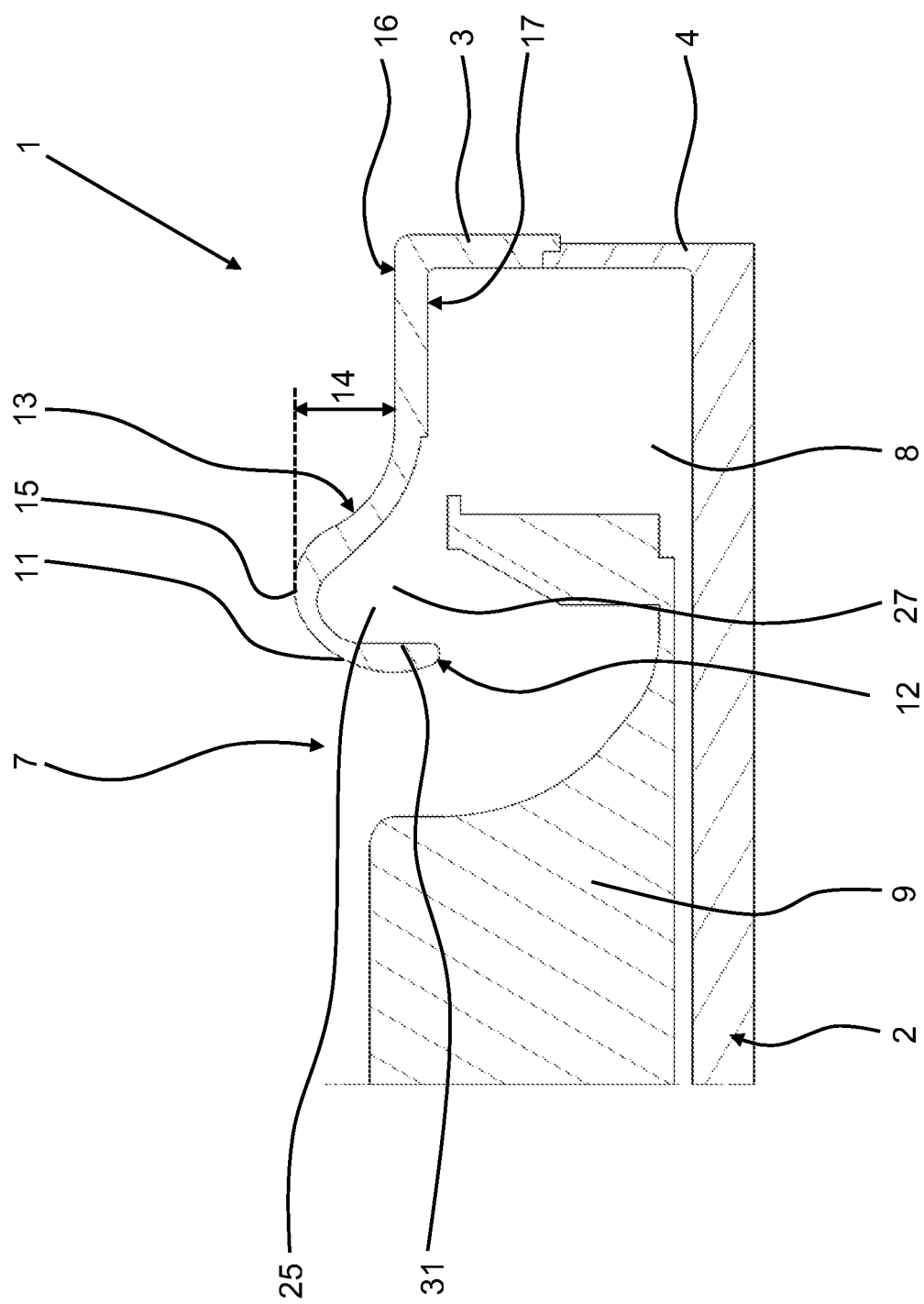
FIG. 6 shows a section through a further exemplary embodiment of a housing.

FIG. 6 shows an exemplary embodiment of a housing 1 for an illustrated radial fan 2. The fan wheel 9 is held rotatably within the fluid chamber 8 between the first housing part 3 and a second housing part 4. At the inner side 17 of the housing part 3, on the opposite side of the domed elevation 15, there is formed an encircling set-back structure 25 which surrounds the inlet opening 7 over the full circumference. The encircling set-back structure 25 is, in the section illustrated, designed such that the wall thickness is approximately constant in the region of the inlet face 11 and of the domed elevation 15. By means of the encircling set-back structure 25, it is possible, while maintaining the same noise generation, in particular in the case of volume flows of greater than two liters per second, for the pressure to be increased in relation to exemplary embodiments without an encircling set-back structure 25. In this exemplary embodiment, an inner flank 31 of the encircling set-back structure 25 is formed parallel to the central axis M of the inlet opening 7.

Figure 7:
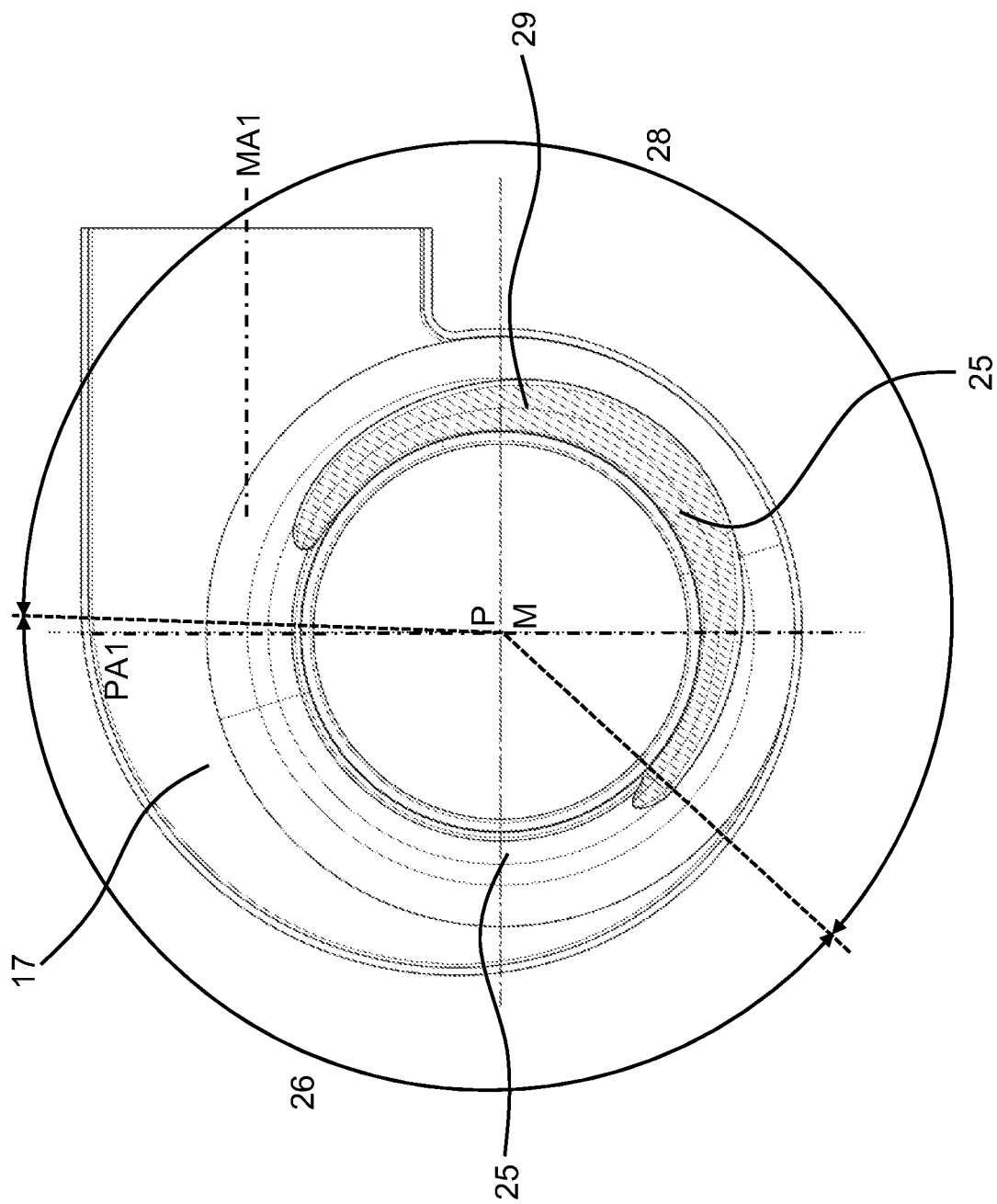
FIG. 7 shows an exemplary embodiment of a housing.
Figure 8:
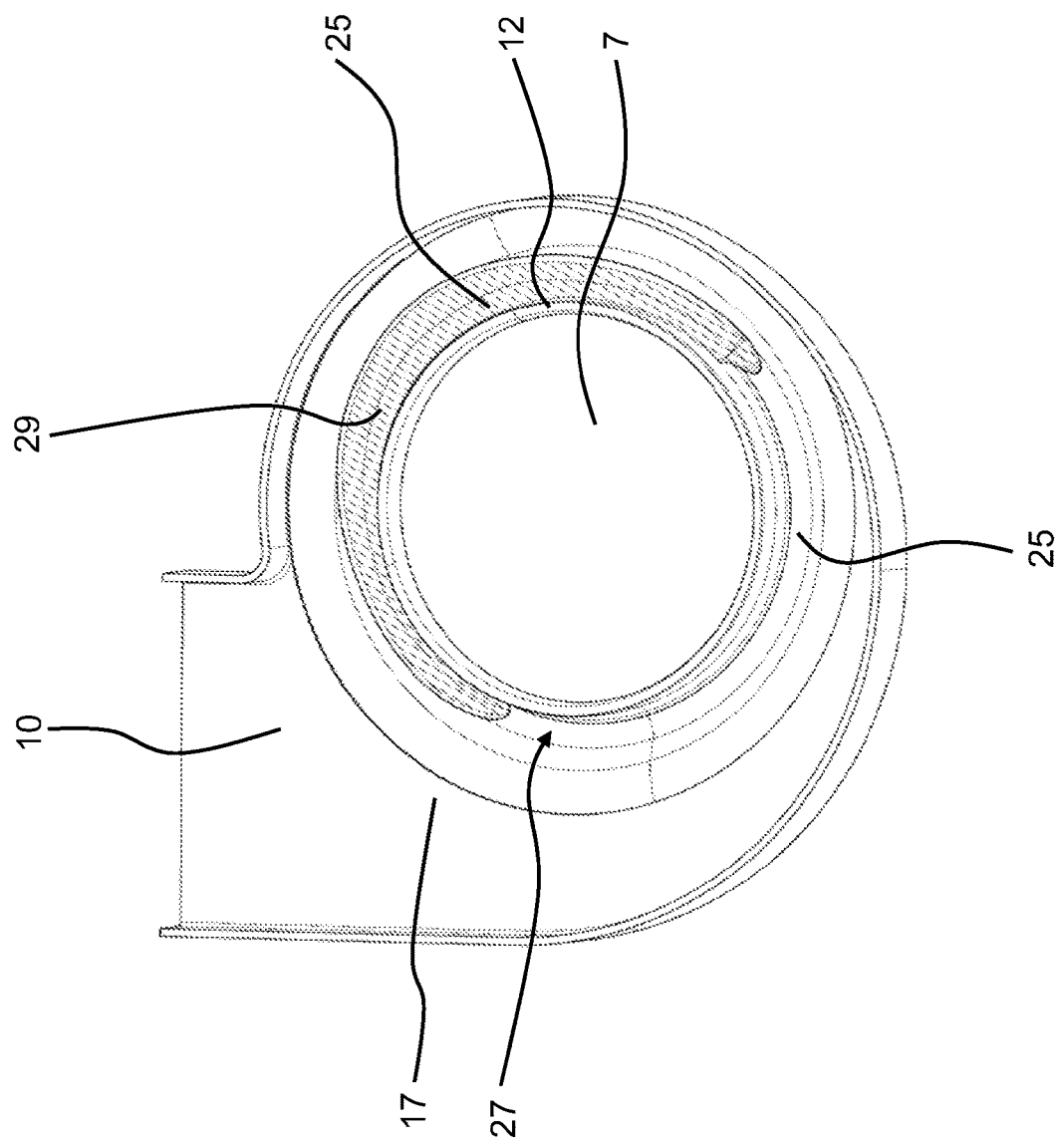
FIG. 8 shows the exemplary embodiment as per FIG. 7 in another view.

FIG. 7 and FIG. 8 show an exemplary embodiment of a housing part 3 from the inner side 17. FIG. 8 shows the exemplary embodiment in a perspective view. The encircling set-back structure 25 extends over the entire circumference of the inlet opening 7. In a first arc segment 26 along the circumference, the encircling set-back structure 25 has a basic cross section 27, which is illustrated for example in FIG. 6. In a second arc segment 28, the encircling set-back structure 25 has a fill cross section 29, the cross section of which deviates from the basic cross section 27 and varies. In the illustrated exemplary embodiment, the fill cross section 29 extends over a second arc segment 28 with a center angle of approximately 220°. In a polar coordinate system which is directed onto the inner side 17 of the housing part 3 and the pole P of which coincides with the central axis M of the inlet opening 7 and the pole axis PA1 of which is orthogonal with respect to a central axis MA1 of the outlet opening 10 of the housing 1, the illustrated fill cross section 29 is—with its total center angle of 220°—arranged in an angle range between 138° and 358°. In FIG. 8*a*, the fill cross section 29 is illustrated by dashed lines merely for illustrative purposes; it is not a section.

Figure 9A:
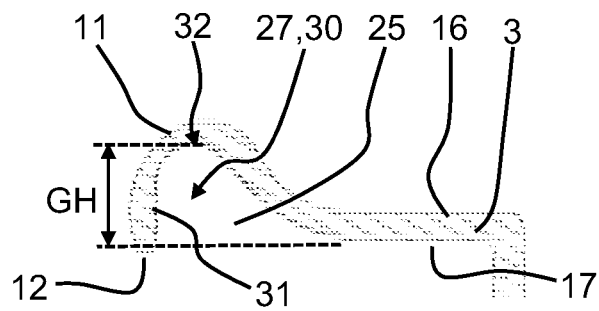
Figure 9D:
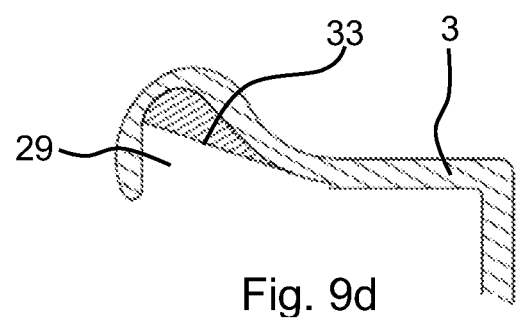
Figure 9B:
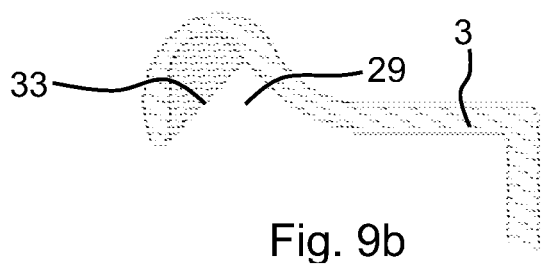
Figure 9E:
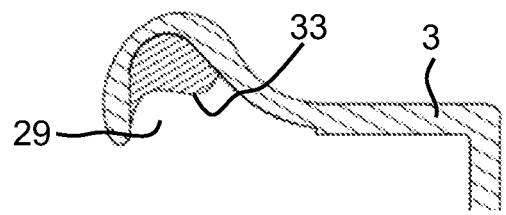
Figure 9C:
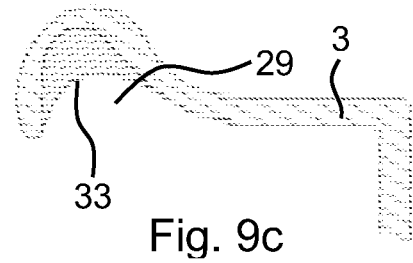
Figure 9F:
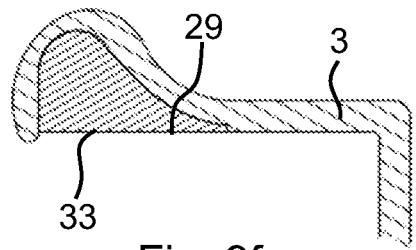

FIG. 9*a* to FIG. 9*g* show exemplary embodiments of the basic cross section 27 and of the fill cross section 29 of the encircling set-back structure 25. The cross section reduced in relation to the basic cross section 27 is illustrated by hatching in FIG. 9*b* to FIG. 9*g* merely for the purposes of a simplified illustration; it is not a different material. FIG. 9*a* shows the encircling set-back structure 25 with a basic cross section 27 which, in the cross section, has a free basic area 30 with a basic height GH, which is measured at the inner flank 31 between an imaginary plane at the inner side 17 and that point 30 in the basic cross section 27 which is furthest remote from said plane along the central axis M or the inner flank 31.

Figure 9G:
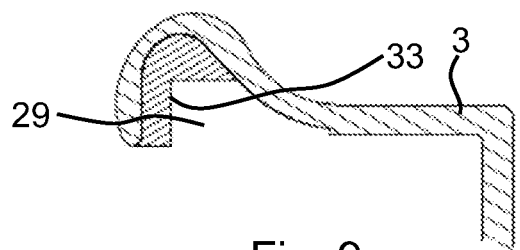

FIG. 9*b* to FIG. 9*g* show exemplary embodiments of the fill cross section 29 with different profiles 33 in the base region over the width of the encircling set-back structure 25. In the cross section, the profiles 33 have, in particular in a radial direction proceeding from the central axis M, either a continuous, arcuate course (FIGS. 9*c* and 9*e*), a linear course (FIGS. 9*b*, 9*d* and 9*f*) or a stepped course (FIG. 9*g*). FIG. 9*b* to FIG. 9*g* show in each case a section in the region of the maximum reduction of the free basic area 30. Proceeding from the illustrated maximum reduction of the of the free basic area 30, this increases again in both circumferential directions in that, with a constant profile 33, a continuous increase of the free basic area 30 is realized—the hatched area decreases proceeding from the illustrated maximum area.

FIG. 10*a* to FIG. 10*h* show exemplary embodiments of the course of the fill cross section 29 in percent—on the ordinate axis. The value of 100% is illustrated in all exemplary embodiments of FIGS. 9*b* to 9*g*; the course illustrated in FIG. 10*a* to FIG. 10*h* is realized over the circumference proceeding from said maximum value. The circumference is illustrated on the basis of the angle in a coordinate system as per FIG. 7 on the abscissa axis. The exemplary embodiments of FIGS. 10*d*, 10*e* and 10*f* show exemplary embodiments with at least two second arc segments 28 with a varying fill cross section 29, which, at least locally on the circumference, has one of the profiles of FIG. 9*b* to FIG. 9*g*, specifically at the illustrated maxima. The exemplary embodiments of FIGS. 10*a*, 10*b*, 10*c*, 10*g* and 10*h* show exemplary embodiments in which the second arc segment 28 extends with the fill cross section 29 approximately fully over the entire circumference.

FIG. 11 shows an exemplary embodiment of a housing 1 for an illustrated radial fan 2. As in the exemplary embodiment as per FIG. 1, over the entire circumference of the inlet opening 7, the inlet face 11 has, in cross section, a form which corresponds to the form of the Fibonacci spiral, in particular with three different radii. The inlet face 11 extends at least partially on a domed elevation 15 which surrounds the inlet opening 7. On the outer side 17 of the housing part 3, the domed elevation 15 is surrounded by a honeycomb-like supporting structure 5, the height of which corresponds to the height 14—see FIG. 2—of the domed elevation 15. The supporting structure 5 is formed in one piece with the housing part 3 and serves in particular for stabilizing the housing part 3. In this exemplary embodiment, the supporting structure extends over the entire face of the outer side 16.

FIG. 12 and FIG. 13 show an exemplary embodiment of a housing part 3 from the inner side 17. The inlet opening 7 is, along its circumference, partially surrounded by an encircling projection 6, which extends over a projection arc segment 34 which covers a center angle of approximately 250°—see FIG. 12. In a coordinate system as per FIG. 7, the projection arc segment 34 is arranged approximately in an angle range between 135° and 25°. The encircling projection 6 is illustrated with hatching merely for illustrative purposes. In this exemplary embodiment, the encircling projection 6 is formed in one piece with the housing part 3. The encircling projection 6 is, in the assembled state, arranged substantially in the pressure region of a radial fan 2, whereby the performance characteristics are advantageously influenced.

FIGS. 14*a* to 14*g* show exemplary embodiments of encircling projections 6 in cross section, specifically at a point with the maximum area of the encircling projection in the cross section. Proceeding from the areas illustrated in FIG. 14*a* to FIG. 14*h*, the area of the encircling projection 6 in the cross section decreases continuously or has a course which is illustrated in FIGS. 15*a* to 15*h*. Here, the sections illustrated in FIG. 14*a* to FIG. 14*h* are at the absolute maximum of FIG. 15*a* to FIG. 15*h*. The stated angles in FIG. 15*a* to FIG. 15*h* relate to a coordinate system as per FIG. 7.

In the exemplary embodiments of FIG. 14*a* to FIG. 14*h*, the encircling projection 6 is formed as a separate part and is inserted and fastened into a recess 35 in the housing part 3. The illustrated encircling projections 6 have a polygonal and/or at least partially curved cross section. A maximum height 36, illustrated by way of example in FIGS. 14*a* and 14*g*, of the encircling projection 6 is preferably selected such that a gap between a fan wheel 9 and the maximum height 36 amounts to between 1 mm and 5 mm.

The invention claimed is:

1. A housing (1) for a radial fan (2), said housing comprising: at least one housing part (3), wherein the housing part (3) has at least one inlet opening (7), wherein a fluid chamber (8) for accommodating at least one fan wheel (9) can be at least partially delimited by the housing part (3), and an encircling set-back structure (25) which at least partially circumferentially surrounds the inlet opening (7) is formed on an inner side (17) of the housing part (3), wherein the encircling set-back structure (25) has a basic cross section (27) in at least one first arc segment (26) along the circumference, and has a varying fill cross section (29)

in at least on second arc segment (28), wherein the varying fill cross section (29) extends over an arc segment (28) with a center angle of between 1° and 359°.

2. The housing (1) as claimed in claim 1, wherein the encircling set-back structure (25) has a free basic area (30) in the basic cross section (27), and in that the free basic area (30) is reduced in the varying fill cross section (29).

3. The housing (1) as claimed in claim 1, wherein in a polar coordinate system which lies against the inner side (17) of the housing part (3) and the pole (P) of which coincides with a central axis (M) of the inlet opening (7) and the pole axis (PA1) of which is orthogonal with respect to the central axis (MA1) of an outlet opening (10), the varying fill cross section (29) extends in an angle range between 120° and 360°.

4. The housing (1) as claimed in claim 1, wherein the varying 40 fill cross section (29) has a continuous or discontinuous profile (33) comprising a linear, arcuate and/or stepped profile (33).

5. The housing (1) as claimed in claim 1, wherein the housing part (3) is formed from a plastic.

6. A radial fan (2), having at least one fan wheel (9), wherein the fan wheel (9) is arranged rotatably in a fluid chamber (8) of a housing (1), the housing having at least one housing part (3), wherein the housing part (3) has at least one inlet opening (7), wherein the fluid chamber (8) for accommodating the at least one fan wheel (9) is at least partially delimited by the at least one housing part (3), and an encircling set-back structure (25) which at least partially circumferentially surrounds the inlet opening (7), and an encircling projection (6) which at least partially surrounds the inlet opening, is formed on an inner side (17) of the at least one housing part (3), wherein the encircling set-back structure (25) has a basic cross section (27) in at least one first arc segment (26) along the circumference, and has a varying fill cross section (29) in at least one second arc segment (28), wherein the varying fill cross section (29) extends over an arc segment (28) with a center angle of between 1° and 359°.

7. The radial fan (2) as claimed in claim 6, wherein the encircling set-back structure (25) has a free basic area (30) in the basic cross section (27), and in that the free basic area (30) is reduced in the varying fill cross section (29).

8. The radial fan (2) as claimed in claim 7, wherein in a polar coordinate system which lies against the inner side (17) of the housing part (3) and the pole (P) of which coincides with a central axis (M) of the inlet opening (7) and the pole axis (PA1) of which is orthogonal with respect to the central axis (MA1) of an outlet opening (10), the varying fill cross section (29) extends in an angle range between 120° and 360°.

9. The radial fan (2) as claimed in claim 6, wherein the varying fill cross section (29) has a continuous or discontinuous profile (33) comprising a linear, arcuate and/or stepped profile (33).

10. A radial fan (2) as claimed claim 6, wherein the encircling projection (6) extends in at least one projection arc segment (34) along the circumference the projection arc segment (34) having a center angle between 1° and 359°.

11. A radial fan (2) as claimed in claim 10, wherein a polar coordinate system which lies against the inner side (17) of the housing part (3) and the pole (P) of which coincides with a central axis (M) of the inlet opening (7) and the pole axis (PA1) of which is orthogonal with respect to the central axis (MA1) of an outlet opening (10), the projection arc segment (34) extends in an angle range between 120° and 360°.

12. A radial fan (2) as claimed claim 6, wherein the encircling projection (6) has a cross section which varies over its extent.

13. A radial fan (2) as claimed in claim 6, wherein the encircling projection (6) is at least partially inset into the housing part (3).

14. A housing (1) for a radial fan (2), said housing comprising: at least one housing part (3), wherein the housing part (3) has at least one inlet opening (7), wherein a fluid chamber (8) for accommodating at least one fan wheel (9) can be at least partially delimited by the housing part (3), and an encircling projection (6) which at least partially surrounds the inlet opening, is formed on an inner side (17) of the housing part (3), wherein the encircling projection (6) has a cross section which decreases continuously over its extent.

15. The housing (1) as claimed claim 14, wherein the encircling projection (6) extends in at least one projection arc segment (34) along the circumference, the projection arc segment (34) having a center angle between 1° and 359°.

16. The housing (1) as claimed in claim 15, wherein in a polar coordinate system which lies against the inner side (17) of the housing part (3) and the pole (P) of which coincides with a central axis (M) of the inlet opening (7) and the pole axis (PA1) of which is orthogonal with respect to the central axis (MA1) of an outlet opening (10), the projection arc segment (34) extends in an angle range between 120° and 360°.

17. The housing (1) as claimed in claim 14, wherein the encircling projection (6) is at least partially inset into the housing part (3).

* * * * *